United States Patent
Awad et al.

(10) Patent No.: US 12,128,553 B2
(45) Date of Patent: Oct. 29, 2024

(54) INFINITE-ROTATION INFINITE-STIFFNESS VARIABLE STIFFNESS ACTUATOR (IRISVSA) WITH APPLICATION FOR COMPLIANT SUPERNUMERARY ROBOTIC LIMB

(71) Applicant: Khalifa University of Science and Technology, Abu Dhabi (AE)

(72) Inventors: Mohammed Ismail Awad, Abu Dhabi (AE); Mohammed Ahmed Ramadan, Abu Dhabi (AE); Basma Bashir Mohamed Hasanen, Abu Dhabi (AE); Irfan Hussain, Abu Dhabi (AE); Seneviratne Mudigansalage Seneviratne, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 12 days.

(21) Appl. No.: 18/047,561

(22) Filed: Oct. 18, 2022

(65) Prior Publication Data
US 2024/0123636 A1    Apr. 18, 2024

(51) Int. Cl.
*B25J 9/12* (2006.01)
*B25J 9/10* (2006.01)
(Continued)

(52) U.S. Cl.
CPC ............ *B25J 19/068* (2013.01); *B25J 9/102* (2013.01); *B25J 9/126* (2013.01); *F16F 1/042* (2013.01); *B25J 9/1005* (2013.01)

(58) Field of Classification Search
CPC . B25J 19/068; B25J 9/102; B25J 9/126; B25J 9/1005; B25J 9/0006; F16F 1/042
(Continued)

(56) References Cited

U.S. PATENT DOCUMENTS 4,585,387 A * 4/1986 Jayne ................ B25J 15/0206
                                                    414/730
5,243,872 A * 9/1993 Yang ................. G01B 11/2504
                                                    901/23
(Continued)

FOREIGN PATENT DOCUMENTS

CN    105328711 A  *  2/2016
CN    107234632 A  * 10/2017  ............. B25J 17/02
(Continued)

OTHER PUBLICATIONS

S. Wolf et al., "Variable Stiffness Actuators: Review on Design and Components," in IEEE/ASME Transactions on Mechatronics, vol. 21, No. 5, pp. 2418-2430, Oct. 2016, doi: 10.1109/TMECH.2015.2501019. (Year: 2016).*
(Continued)

*Primary Examiner* — T. Scott Fix
(74) *Attorney, Agent, or Firm* — Kilpatrick Townsend & Stockton LLP

(57) ABSTRACT

A supernumerary robotic limb (SRL) system can include a plurality of rigid links, a joint that connects one rigid link to another rigid link in the plurality of rigid arms, and two variable stiffness actuators (VSAs) configured to drive the plurality of rigid links in order to complete at least one task. The VSAs can exhibit infinite rotation and infinite stiffness. The VSAs can include an output link. Additionally, the VSAs can include a set of elastic elements mounted on the output link. The VSAs can include an input link configured to provide kinetic energy for the output link. The VSAs can include a dynamic chassis configured to connect with the input link. Additionally, the VSAs can include a stiffness adjustor included in the dynamic chassis and configured to adjust an elastic transmission between at least one elastic element of the set of elastic elements and the output link.

19 Claims, 18 Drawing Sheets

(51) Int. Cl.
*B25J 19/06* (2006.01)
*F16F 1/04* (2006.01)

(58) Field of Classification Search
USPC .................................................... 74/490.03
See application file for complete search history.

(56) References Cited

U.S. PATENT DOCUMENTS

| | | | | |
|---|---|---|---|---|
| 5,502,363 | A * | 3/1996 | Tasch | B25J 9/1641 901/14 |
| 8,500,823 | B2 * | 8/2013 | Herr | A61F 2/70 623/44 |
| 8,950,967 | B2 * | 2/2015 | Van Ham | B25J 19/0016 403/111 |
| 2013/0319143 | A1 * | 12/2013 | Huang | F16H 1/225 74/89.14 |
| 2016/0082603 | A1 * | 3/2016 | Schimmels | F16F 1/22 901/19 |
| 2016/0229056 | A1 * | 8/2016 | Takagi | B25J 9/1633 |
| 2017/0181917 | A1 * | 6/2017 | Ohta | A61H 1/0281 |
| 2019/0061153 | A1 * | 2/2019 | Gregg | B25J 9/1633 |
| 2023/0150121 | A1 * | 5/2023 | Guo | F16D 27/12 74/490.04 |

FOREIGN PATENT DOCUMENTS

| | | | | |
|---|---|---|---|---|
| CN | 107891438 | A * | 4/2018 | .......... B25J 15/0009 |
| CN | 108748254 | A * | 11/2018 | .......... B25J 15/0009 |
| CN | 113442163 | B * | 6/2023 | |
| EP | 2444207 | A1 * | 4/2012 | ............ B25J 19/068 |
| ES | 2797550 | A1 * | 12/2020 | ................ F16F 1/10 |
| GB | 1189800 | A * | 2/1969 | ............. G10D 13/02 |
| GB | 2579595 | A * | 7/2020 | ............. A01D 46/30 |
| JP | 2008200819 | A * | 9/2008 | |
| KR | 101887539 | B1 * | 7/2016 | |

OTHER PUBLICATIONS

Vanderborght, B., Albu-Schäffer, A., Bicchi, A., Burdet, E., Caldwell, D.G., Carloni, R., Catalano, M., Eiberger, O., Friedl, W., Ganesh, G. and Garabini, M., 2013. Variable impedance actuators: A review. Robotics and autonomous systems, 61(12), pp. 1601-1614.
Tonietti, G., Schiavi, R., and Bicchi, A., , "Design and Control of a Variable Stiffness Actuator for Safe and Fast Physical Human/Robot Interaction," International Conference on Robotics and Automation, 2005.
R. Schiavi, G. Grioli, S. Sen, A. Bicchi, "VSA-II: a novel prototype of variable stiffness actuator for safe and performing robots interacting with humans", in: IEEE International Conference on Robotics and Automation, ICRA 2008, pp. 2171-2176.
Migliore, Shane A., Brown, Edgar A., & DeWeerth, Stephen P. "Biologically Inspired Joint Stiffness Control" IEEE International Conference on Robotics and Automation (ICRA), 2005 . . . pp. 4519-4524.
Hurst, Jonathan W, Chestnutt, Joel, & Rizzi, Alfred "The Actuator with Mechanically Adjustable Series Compliance" IEEE Transactions on Robotics vol. 26 , Issue: 4 2010, pp. 597-606.
Liu, Y., Liu, X., Yuan, Z. and Liu, J., 2019. Design and analysis of spring parallel variable stiffness actuator based on antagonistic principle. Mechanism and Machine Theory, 140, pp. 44-58.
Bilancia, P., Berselli, G. and Palli, G., 2020. Virtual and physical prototyping of a beam-based variable stiffness actuator for safe human-machine interaction. Robotics and Computer-Integrated Manufacturing, 65, p. 101886.
R. Van Ham, B. Vanderborght, M. Van Damme, B. Verrelst, D. Lefeber, "MACCEPA, the mechanically adjustable compliance and controllable equilibrium position actuator: design and implementation in a biped robot", Robotics and Autonomous Systems 55 (10), 2007 pp. 761-768.

B. Vanderborght, N. Tsagarakis, R. Van Ham, I. Thorson, D. Caldwell, "Maccepa 2.0: compliant actuator used for energy efficient hopping robot chobino1d", Autonomous Robots (2009) pp. 1-11.
A. Jafari, N. Tsagarakis, B. Vanderborght, D. Caldwell, A novel actuator with adjustable stiffness (AwAS), in: IEEE/RSJ International Conference on Intelligent Robots and Systems, IROS 2010, 2010, pp. 4201-4206.
B.-S. Kim, J.-B. Song, Design and control of a variable stiffness actuator based on adjustable moment arm, IEEE Transactions on Robotics 28 (5) (2012) 1145-1151.
A. Jafari, N. Tsagarakis, D.G. Caldwell, AwAS-II: a new actuator with adjustable stiffness based on the novel principle of adaptable pivot point and variable lever ratio, in: IEEE International Conference on Robotics and Automation, ICRA, 2011, pp. 4638-4643.
N. Tsagarakis, I. Sardellitti, C.D.G., A new variable stiffness actuator(CompAct-VSA): design and modelling (2011) 378-383.
S.S. Groothuis, G. Rusticelli, A. Zucchelli, S. Stramigioli, R. Carloni, The vsaUT-II: a novel rotational variable stiffness actuator, in: IEEE InternationalConference on Robotics and Automation, ICRA 2012, 2012.
Sun, J., Zhang, Y., Zhang, C., Guo, Z. and Xiao, X., 2017, May. Mechanical design of a compact serial variable stiffness actuator (SVSA) based on lever mechanism. In 2017 IEEE International Conference on Robotics and Automation (ICRA) (pp. 33-38). IEEE.
Sun, J., Guo, Z., Sun, D., He, S. and Xiao, X., 2018. Design, modeling and control of a novel compact, energy-efficient, and rotational serial variable stiffness actuator (SVSA-II). Mechanism and Machine Theory, 130, pp. 123-136.
Groothuis, S.; Carloni, R.; Stramigioli, S. A Novel Variable Stiffness Mechanism Capable of an Infinite Stiffness Range and Unlimited Decoupled Output Motion. Actuators 2014, 3, 107-123. https://doi.org/10.3390/act3020107.
M. I. Awad et al., "Modeling, design & characterization of a novel Passive Variable Stiffness Joint (pVSJ)," 2016 IEEE/RSJ International Conference on Intelligent Robots and Systems (IROS), 2016, pp. 323-329, doi: 10.1109/IROS.2016.7759074.
G. Mathijssen, D. Lefeber and B. Vanderborght, "Variable Recruitment of Parallel Elastic Elements: Series-Parallel Elastic Actuators (SPEA) With Dephased Mutilated Gears," in IEEE/ASME Transactions on Mechatronics, vol. 20, No. 2, pp. 594-602, Apr. 2015, doi: 10.1109/TMECH.2014.2307122.
G. Mathijssen, R. Furnémont, B. Brackx, R. Van Ham, D. Lefeber and B. Vanderborght, "Design of a novel intermittent self-closing mechanism for a MACCEPA-based Series-Parallel Elastic Actuator (SPEA), " 2014 IEEE/RSJ International Conference on Intelligent Robots and Systems, 2014, pp. 2809-2814, doi: 10.1109/IROS.2014.6942947.
G. Mathijssen, R. Furnémont, S. Beckers, T. Verstraten, D. Lefeber and B. Vanderborght, "Cylindrical cam mechanism for unlimited subsequent spring recruitment in Series-Parallel Elastic Actuators," 2015 IEEE International Conference on Robotics and Automation (ICRA), 2015, pp. 857-862, doi: 10.1109/ICRA.2015.7139278.
G. Mathijssen et al., "+SPEA introduction: Drastic actuator energy requirement reduction by symbiosis of parallel motors, springs and locking mechanisms," 2016 IEEE International Conference on Robotics and Automation (ICRA), 2016, pp. 676-681, doi: 10.1109/ICRA.2016.7487193.
E. J. Rouse, L. M. Mooney, E. C. Martinez-Villalpando and H. M. Herr, "Clutchable series-elastic actuator: Design of a robotic knee prosthesis for minimum energy consumption," 2013 IEEE 13th International Conference on Rehabilitation Robotics (ICORR), 2013, pp. 1-6, doi: 10.1109/ICORR.2013.6650383.
M. I. Awad et al. "Novel Passive Discrete Variable Stiffness Joint (pDVSJ): Modeling, Design, and Characterization", IEEE International Conf. of Robotics and Biomimetics (ROBIO) 2016. pp. 1808-1813.
M. I. Awad, I. Hussain, D. Gan, A. Az-zu'bi, C. Stefanini, K. Khalaf, Y. Zweiri, T. Taha, J. Dias, and L. Seneviratne, "Passive discrete variable stiff-ness joint (pdvsj-ii): modeling, design, characterization, and testing toward passive haptic interface,"Journal of Mechanisms and Robotics, vol. 11, No. 1,2019.
M. I. Awad, D. Gan, I. Hussain, A. Az-Zu'bi, C. Stefanini, K. Khalaf, Y. Zweiri, J. Dias, andL. D. Seneviratne, "Design of a novel

(56) References Cited

OTHER PUBLICATIONS passivebinary-controlled variable stiffness joint (bpvsj) to-wards passive haptic interface application, "IEEE Access, vol. 6, pp. 63 045-63 057, 2018.
I. Hussain , A. Albalasi, M. I. Awad, et al., "Design and Control of a Discrete Variable Stiffness Actuator With Instant Stiffness Switch for Safe Human-Robot Interaction," in IEEE Access, vol. 9, pp. 118215-118231, 2021, doi: 10.1109/ACCESS.2021.3105587.
K. W. Hollander, T. G. Sugar, and D. E. Herring, "Adjustable robotic tendon using a 'jack spring'/spl trade," in 9th International Conference on Rehabilitation Robotics, 2005. ICORR 2005. IEEE, 2005, pp. 113-118.
J. Choi, S. Hong, W. Lee, S. Kang, and M. Kim, "A robot joint with variable stiffness using leaf springs," IEEE Transactions on Robotics, vol. 27, No. 2, pp. 229-238, 2011.
W. Wang, X. Fu, Y. Li, and C. Yun, "Design of variable stiffness actuator based on modified gear-rack mechanism," Journal of Mechanisms and Robotics, vol. 8, No. 6, p. 061008, 2016.

* cited by examiner

INFINITE-ROTATION INFINITE-STIFFNESS VARIABLE STIFFNESS ACTUATOR (IRISVSA) WITH APPLICATION FOR COMPLIANT SUPERNUMERARY ROBOTIC LIMB

BACKGROUND OF THE INVENTION

Health issues such as strokes can result in health problems ranging from temporary partial to lasting total disability of one or more limbs. Supernumerary Robotic limbs (SRLs) can assist users with impaired body parts such as an impaired arm. A challenge can lie in designing robotic limbs for safe interaction with a user during execution of a task without jeopardizing accuracy or prolonging a task completion time.

BRIEF SUMMARY OF THE INVENTION

An SRL system can assist users in completing tasks. For example, a system described herein can include a plurality of rigid links. The system can include at least one joint configured to connect a first rigid link to a second rigid link of the plurality of rigid links. Additionally, the system can include two Variable Stiffness Actuators (VSAs) coupled with each of the first rigid link and the second rigid link, The two VSAs can be configured to drive the plurality of rigid links.

In another example, a method described herein can include switching at least one VSA of a SRL system from a high stiffness state to a low stiffness state. The method can further include driving at least one rigid link of the SRL system with the at least one VSA to move an end of a second rigid link to a predetermined location of a workspace, wherein the second rigid link is connected to the first rigid link by at least one joint. Additionally, the method can include switching the at least one VSA from the low stiffness state to the high stiffness state. Further, the method can include activating an end-effector of the SRL system to perform at least one task.

DETAILED DESCRIPTION OF THE INVENTION

Figure 1:
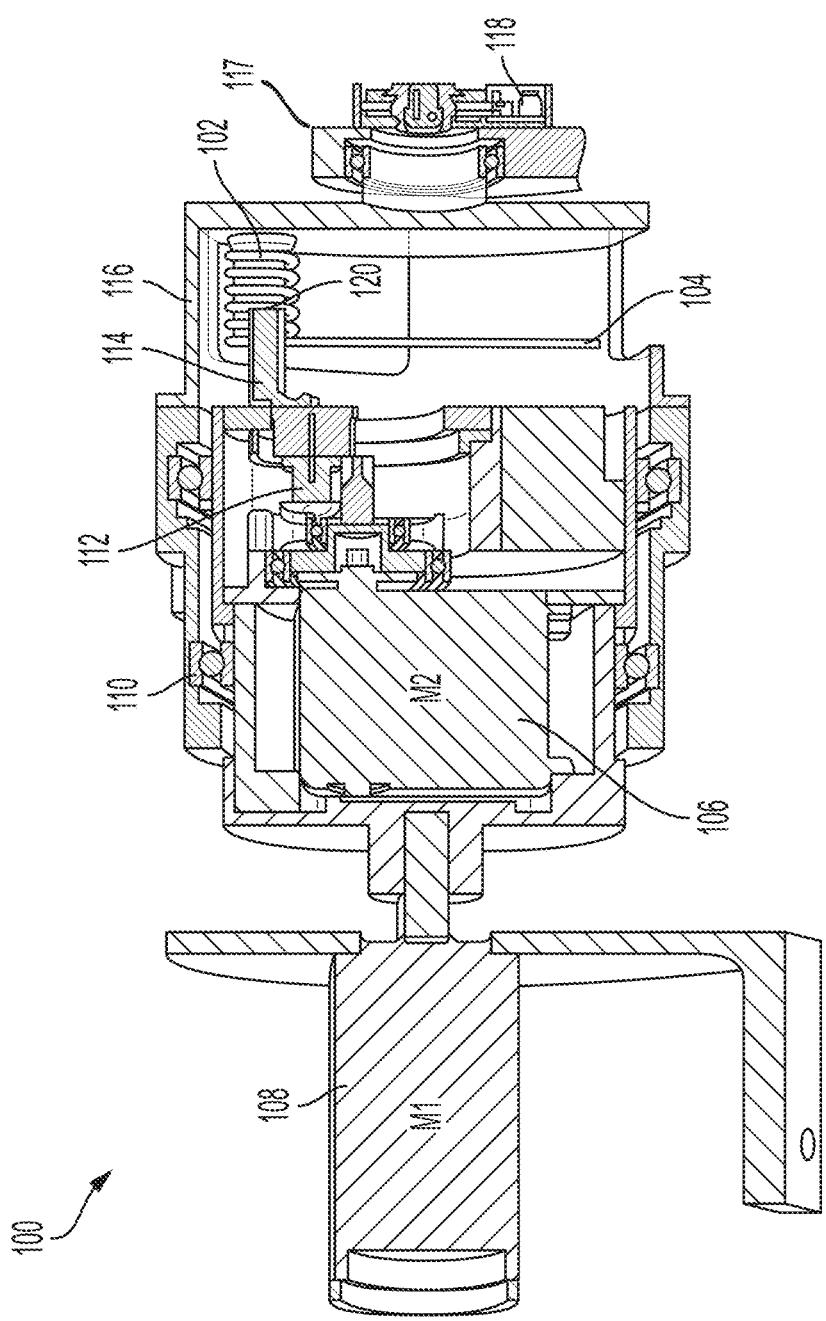
FIG. 1 is a schematic cross section view of a VSA that exhibits infinite rotation and infinite stiffness according to one example of the present disclosure.

Loss in upper extremity motor control and function can be an unremitting symptom in post-stroke patients. The loss in motor control and function can impose hardships in accomplishing daily life activities of the patient. Supernumerary robotic limbs (SRLs) can act as a solution to regain the lost degrees of freedom (DoFs) by introducing an independent new limb. The actuation systems in an SRL can be categorized into rigid and soft actuators. Soft Actuators can include advantages such as intrinsic safety, low cost, and energy efficiency. However, the soft actuators can suffer from low stiffness, which jeopardizes accuracy in performing tasks. Variable stiffness actuators (VSAs) can ensure both accuracy and safety while performing tasks. Certain aspects and examples of the present disclosure relate to an SRL system based on VSAs. The SRL based on the VSAs can assist patients, such as post-stroke patients, in performing one or more tasks, such as bimanual tasks (e.g., eating with a fork and knife). Modeling, design and description of the SRL system are included in the present disclosure. The SRL system can be evaluated and verified for accuracy in performing tasks based on multiple methods. These methods can include any or a combination of predefined trajectories, teleoperation (direct or bilateral), methods involving biosensing feedback (e.g., eye-tracking, brain-machine-interface, electrocardiogram ECG, or Electromyography EMG), vision-based control methods, etc. Safety of the SRL system can be verified by utilizing a momentum observer for collision detection, and several post-collision reaction strategies can be evaluated through a soft tissue injury test. An assistance process associated with the SRL system can be qualitatively verified through standard user-satisfaction questionnaires.

Based on the report of the Global Burden of Disease and Risk Factors Study, twelve million different stroke cases occurred worldwide in 2019. Strokes can result in serious health problems ranging from temporary partial to lasting total disability of one or more limbs of a human. Post-stroke impairments can include the total functional disability of one of the upper limbs. Restoration of lost upper limb functions can be more difficult than restoration of lower limb functions in post-stroke patients. Reports indicate that only 14% of post-stroke patients can recover after a stroke back to an original healthy state, 25% of the post-stroke patients can have a level of enhancement in affected extremities, and nearly 60% can suffer from lasting complete limb malfunction. Hemiplegic patients can spend more time than usual completing regular daily life tasks. Normally performed bimanual tasks can cause fatigue to a healthy limb, which can negatively impact physical and psychological states of a patient.

SRLs may act as a solution to assist hemiplegic patients in overcoming difficulties associated with activities of daily life. Assistance from an SRL can be in the form of augmenting the healthy limb (arm or finger) by expanding capabilities of the healthy limb towards completing bimanual tasks. The assistance from the SRL can also come in the form of compensating for missing manipulation capabilities of an impaired limb by the SRL acting as an extra limb. A significance of SRLs over other assistive robotic solutions (i.e., exoskeleton and prosthesis) can lie in an independence of the SRL from a presence (or an absence) of the impaired limb (unlike prosthesis) and an independence of the SRL from being constrained by a limb kinematic (un-like exoskeletons). Supernumerary robotic fingers have been proposed for augmenting a healthy arm of a hemiplegic patient to enable the healthy arm to perform bimanual tasks. Other studies indicate that supernumerary robotic fingers can also compensate missing manipulation capabilities in an impaired hand. Another group of researchers revealed that supernumerary robotic arms for hemiplegic patients can compensate for the capabilities of an impaired arm in a bimanual task of eating with a fork and knife. The group of researchers proposed a control strategy to integrate voluntary human movements and autonomous reactive control of a robotic limb. Another challenge can lie in a design for safe interaction between the SRL and a human during an execution of a task without jeopardizing accuracy or a task completion time. The present disclosure describes a utilization of Variable Stiffness Actuators (VSAs) in SRLs to harvest advantageous features of intrinsic safety and energy efficiency found in soft actuators and high accuracy task performance of rigid actuators. VSAs can achieve the advantageous features due to the VSAs capability of being tuned between low and high values of stiffness. A broad spectrum of VSAs have been proposed by researchers, motivations behind each proposed design may include a stiffness range, a rate-of-change in stiffness, a maximum elastic deflection, a maximum elastic-energy stored, and energy-efficiency. Although various embodiments are described in connection with SRLs to assist with bimanual tasks, such SRLs can be used to assist with other tasks, whether manual or not.

The present disclosure is organized in three sections. A first section discusses actuators, in particular VSAs. A second section discusses SRLs and a use of VSAs therein. A third section describes modeling and analysis of SRLs.

Certain aspects and examples of the present disclosure relate to an SRL system that includes at least one VSA that exhibits infinite rotation and infinite stiffness. The VSA can be referred to as an "irisVSA". Infinite rotation can mean that rotations are unlimited in that the rotations of the irisVSA can exceed rotation angles of 360 degrees. The active joint irisVSA can exhibit stiffness that varies from a value of zero to infinity. Infinite stiffness exhibited in an object can indicate that an object will remain stationary regardless of an applied force or applied torque. The irisVSA can include an input link, an output link and an elastic element. The stiffness of the irisVSA can be adjusted by changing a transmission between the output link and the elastic element. The elastic element can include two torsional springs mounted on the output link. Each of the two torsional springs can include a long arm at a base of the spring. The transmission between the output link and the elastic element can be adjusted by a stiffness adjusting mechanism. Due to the two calibrated torsional springs, the irisVSA can adjust an interaction force between the output link and an environment such as an SRL environment.

The input link can include a joint-driving brushless DC motor. The input link can be connected to a dynamic chassis. The dynamic chassis can house the stiffness adjusting mechanism. The stiffness adjusting mechanism can include a brushless DC motor that can drive a gear train. A contact force point can be mounted on an outer gear of the gear train. A gear ratio of the gear train can be selected so that the contact force point can move along a straight-line path. One end of the straight-line path can include a center of rotation of the irisVSA. Another end of the straight-line path can include a point along a centerline of the two torsional springs. A position of the contact force point can determine the stiffness of the irisVSA. The stiffness of the irisVSA can have a minimum value of zero when the contact force point is located at the center of rotation of the irisVSA. When the minimum value of the stiffness is achieved, the input link can be disengaged from the output link. An ability to disengage the input link from the output link can act as a safety feature in wearable robotics. The stiffness can have a maximum value when the contact force point is located at the point along the centerline of the two torsional springs. The maximum value of the stiffness can approach infinity. The stiffness of the irisVSA can be altered through changing the transmission between the elastic element and the output link by changing the active length of a torque arm of each of the two torsional springs via a change in the position of the contact force point. The stiffness can be changed without requiring input energy for the elastic element.

A relationship between a range of stiffnesses of the irisVSA and the position of the contact point can be described by a compliance curve. The compliance curve can be adjustable by parameters of each of the torsional springs. The parameters can include a number of coils, a diameter of spring wire, and a spring outer diameter. The irisVSA can be configured to undergo a rapid change in the stiffness of the irisVSA. For example, a hypocycloidal gear train can function as the gear train and can increase a rate of the change in the stiffness. In some examples, the stiffness of the irisVSA can be altered from the minimum value to the maximum value within 0.65 seconds. With such a rapid change in stiffness, the irisVSA can be suitable for use in applications where rapid stiffness changes are needed, such as in lower limb exoskeletons. Lower-limb exoskeleton applications may need fast stiffness changes, particularly during a gait cycle when walking or running.

The input link can include any source of actuation including DC or AC motors, Hydraulics, or Pneumatics. Energy can be stored and released in the elastic elements of the irisVSA, which can reduce energy requirements of motors in the irisVSA. The irisVSA can be built entirely from "off-the-shelf" components. Customized or expensive components may not be needed to realize the irisVSA. A use of "off-the-shelf" components can reduce manufacturing costs and enable mass production of the irisVSA. The VSA can be scaled up or down as needed in terms of size, maximum torque, elastic energy storage, or load capacity. Examples of applications for the irisVSA can include wearable robotics for assistance or rehabilitation, supernumerary limbs for assistance, collaborative robotic manipulators, or haptic interfaces.

FIG. 1 is a schematic cross section view of a VSA 100 that exhibits infinite rotation and infinite stiffness according to one example of the present disclosure. Technological developments in fields such as robotics can involve devices that exhibit a capability to store and release energy. Such devices can include actuators that can possess an elastic element with constant stiffness between a gear and an actuator output. Applications involving interactions with an unknown or dynamic environment including interactions with humans may not be well achieved by stiff actuators. A stiff actuator can be a device that is able to move to a specific location or track a predefined trajectory. Once a position is reached, the stiff actuator can maintain the position even while being subjected to external forces. Stiff actuators may exhibit a high impedance. Impedance in mechanical systems can be a measure of how much a structure resists motion when subjected to a harmonic force.

Variable Impedance Actuators (VIA) may be better equipped to handle applications that include interactions with humans. A VIA can deviate from an equilibrium position depending on external forces and mechanical properties of the VIA. The equilibrium position can be defined as a position where the VIA generates zero force or torque. Subclasses of VIAs can include Variable Stiffness Actuators (VSAs), which may not include a damping element. Stiffness in mechanical systems can describe the extent to which a device resists deformation when subjected to external forces.

The VSA 100 can include an input link 108 and a dynamic chassis 116 connected to the input link 108. In some examples, the input link 108 includes a main motor (labeled M1 in FIG. 1) and a gearbox. The dynamic chassis 116 can include an output link 117 and a case for the output link, a stiffness adjustor 106, a straight-line mechanism 112, main bearings 110, a force contact lever 114, a set of elastic elements, and a rotary encoder 118. The set of elastic elements can include at least one torsional spring 102. In one example, the set of elastic elements includes a second torsional spring, although a different total number of torsional springs is possible. Each torsional spring 102 of the at least one torsional spring 102 can include a long arm 104. The stiffness adjustor 106 can include an electromechanical motor (labeled M2 in FIG. 1).

A source of actuation of the input link 108 can include an electromechanical, hydraulic, or pneumatic source. In some examples, the input link 108 can include a joint-driving Brushless DC motor. The input link 108 can be connected to the dynamic chassis 116 and can provide kinetic energy to the output link of the dynamic chassis 116. The stiffness adjustor 106 can include an additional Brushless DC motor that can drive a gear train. The force contact lever 114 can be mounted on an outer gear of the gear train. The force contact lever 114 can include a contact force point 120 on the end of the force contact lever 114. The straight-line mechanism 112 can include the gear train. The gear train can include a gear ratio such that the contact force point 120 of the force contact lever 114 can move on a straight line from a center of rotation of the VSA 100 to a base center line of the set of elastic elements. A position of the contact force point 120 can determine a stiffness of the VSA 100.

Figure 2:
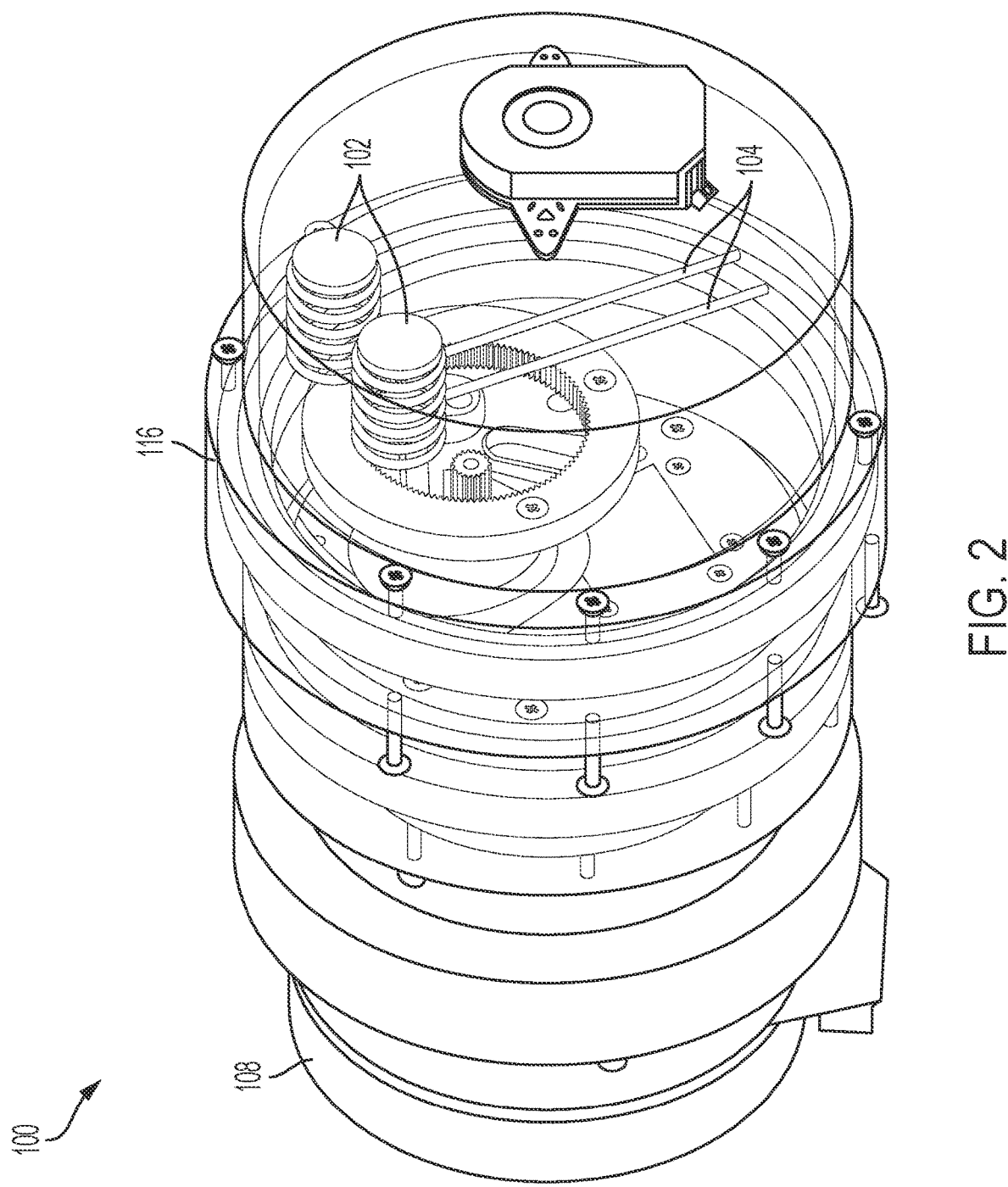
FIG. 2 is a perspective view of a VSA that exhibits infinite rotation and infinite stiffness according to one example of the present disclosure.

FIG. 2 is a perspective view of a VSA 100 that exhibits infinite rotation and infinite stiffness according to one example of the present disclosure. The VSA can include an input link 108 and a dynamic chassis 116 connected to the input link 108. The dynamic chassis 116 can include an output link and a set of elastic elements. The set of elastic elements can include at least one torsional spring 102. FIG. 2 depicts two torsional springs 102. Each torsional spring 102 can include a long arm 104. A stiffness adjustor 106 in the dynamic chassis 116 and can adjust an elastic transmission between the at least one elastic element of the set of elastic elements and the output link.

Figure 3:
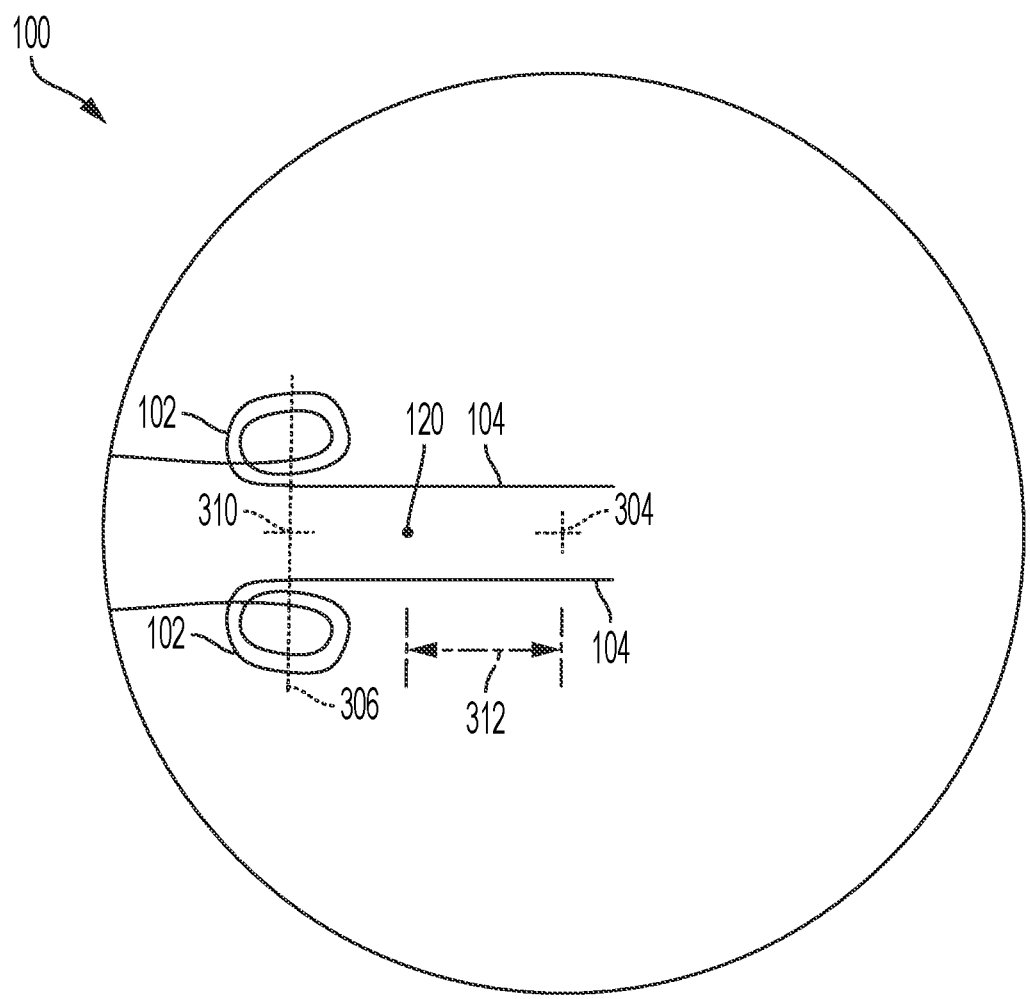
FIG. 3 is a schematic top view depicting a set of elastic elements and a contact force point of a VSA that exhibits infinite rotation and infinite stiffness according to one example of the present disclosure.

FIG. 3 is a schematic top view depicting a set of elastic elements and a contact force point 120 of a VSA 100 that exhibits infinite rotation and infinite stiffness according to one example of the present disclosure. In some examples, the set of elastic elements of the VSA 100 includes a plurality of torsional springs 102. FIG. 3 depicts two torsional springs 102 in the set of elastic elements. In other examples, there can be more than two torsional springs 102 or less than two torsional springs 102 in the set of elastic elements. The schematic includes the plurality of torsional springs 102, a contact force point 120, a center of rotation 304 of the VSA 100, a base center line 306 of the torsional springs 102, a point 310 along the base center line 306, and a torque arm 312. Each torsional spring 102 of the plurality of torsional springs 102 can include a long arm 104.

The contact force point 120 can slide along a line in between the long arms 104 of the torsional springs 102. As the contact force point 120 moves from the center of rotation 304 of the VSA 100 to the point 310 along the base center line 306, the torque arm 312 can increase in length. The torque arm 312 can be defined as a line between the contact force point 120 and the center of rotation 304 of the VSA 100. A change in length of the torque arm 312 can change an engagement of at least one of the torsional springs 102 with variable contact forces for a rotation of an output link of the VSA 100. Thus, changing the length of the torque arm 312 can change the stiffness of the VSA 100.

The stiffness of the VSA 100 can include a range of stiffnesses between a minimum value associated with a position of the contact force point 120 at the center of rotation 304 of the VSA 100 to a maximum value when the position of the contact force point 120 is at a point 310 along the base center line 306 of the set of elastic elements, which is shown in FIG. 3 as two torsional springs 102. The minimum value of the stiffness can lead to zero resistance of motion and the maximum value of the stiffness can lead to no movement of the output link. The length of the torque arm 312 can have a minimum value that coincides with the minimum value of the stiffness of the VSA 100. The length of the torque arm 312 can have a maximum when the VSA 100 stiffness is at a maximum. The stiffness of the VSA 100 can be varied according to a compliance curve that is defined based on at least one of a set of parameters of the set of elastic elements. The set of parameters can include a number of active coils, a spring wire diameter, or an outer diameter per elastic element.

Figure 4:
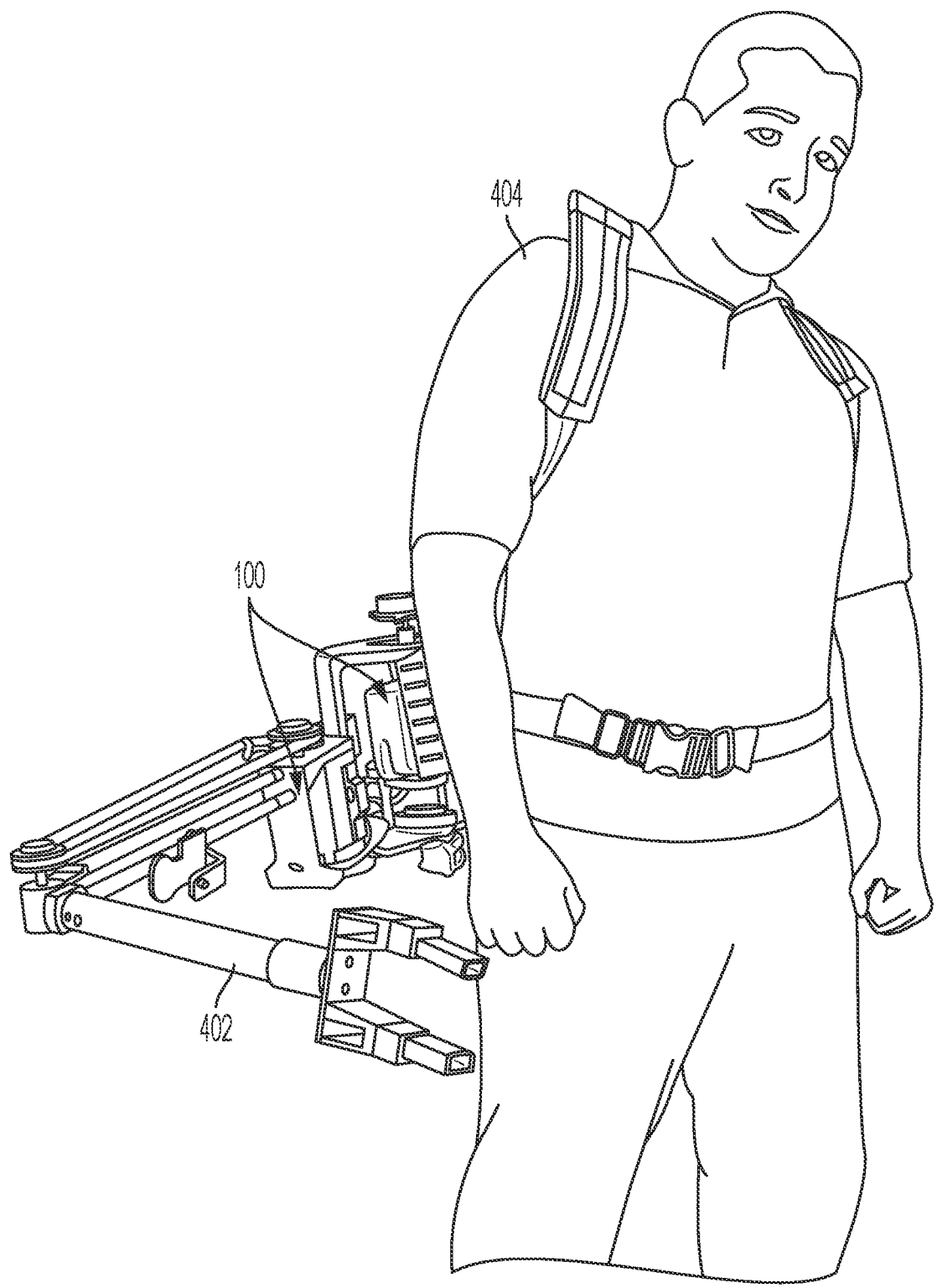
FIG. 4 is a schematic of two VSAs incorporated in an application of supernumerary robotic limbs according to one example of the present disclosure.

FIG. 4 is a schematic of two VSAs 100 incorporated in an application of supernumerary robotic limbs (SRLs) according to one example of the present disclosure. A supernumerary robotic limb can assist a user 404 to perform bimanual tasks. VSAs incorporated in the supernumerary robotic limb can provide features such as intrinsic safety and energy efficiency when stiffness of the VSA is low. When the stiffness VSA is high, the VSA can provide a capability to perform high accuracy tasks. The supernumerary robotic limb depicted in FIG. 4 includes a two degree of freedom robotic arm that can be actuated by the two VSAs.

Figure 5:
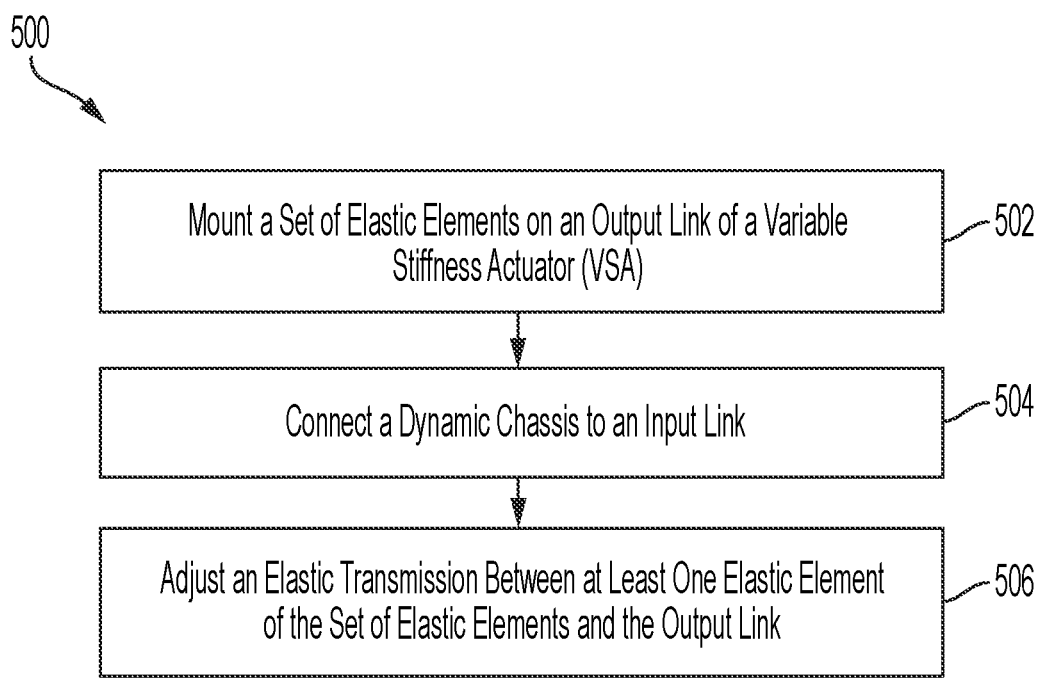
FIG. 5 is a flowchart depicting a process for adjusting an elastic transmission between at least one elastic element and an output link of a VSA that exhibits infinite rotation and infinite stiffness according to one example of the present disclosure.

FIG. 5 is a flowchart depicting a process 500 for adjusting an elastic transmission between at least one elastic element and an output link of a VSA 100 that exhibits infinite rotation and infinite stiffness according to one example of the present disclosure. Operations of flowcharts may be performed by software, firmware, hardware, or a combination thereof. The operations of the flowchart start at block 502.

At block 502, the process 500 involves mounting a set of elastic elements on an output link of the VSA 100. The output link can be included in a dynamic chassis 116. The set of elastic elements can include at least one torsional spring 102 and a base center line of the set of elastic elements. The at least one torsional spring 102 can include a long arm 104. The dynamic chassis 116 can include a gear train that includes an output gear and a force contact lever 114 with a contact force point 120 mounted on the output gear. In some examples, the VSA can permit joint rotations beyond 360 degrees.

At block 504, the process 500 involves connecting the dynamic chassis 116 to an input link 108 of the VSA 100. A source of actuation of the input link 108 can include an electromechanical, hydraulic, or pneumatic source. In some examples, the input link 108 can include a joint-driving Brushless DC motor. The input link 108 can be connected to the dynamic chassis 116 and can provide kinetic energy to the output link of the dynamic chassis 116. In some examples, a connection between the input link 108 and the dynamic chassis 116 can be disengaged as a safety measure.

At block 506, the process 500 involves adjusting an elastic transmission between at least one elastic element of the set of elastic elements and the output link. In some examples, adjusting the elastic transmission varying a stiffness of the VSA by changing a position of a contact force point mounted on an output gear of the gear train. In some examples, a stiffness adjustor can drive the gear train and the stiffness can be varied according to a compliance curve. The compliance curve can be defined by a set of parameters of the set of elastic elements. The parameters can include a number of coils, a spring wire diameter, or an outer diameter per elastic element.

Figure 6:
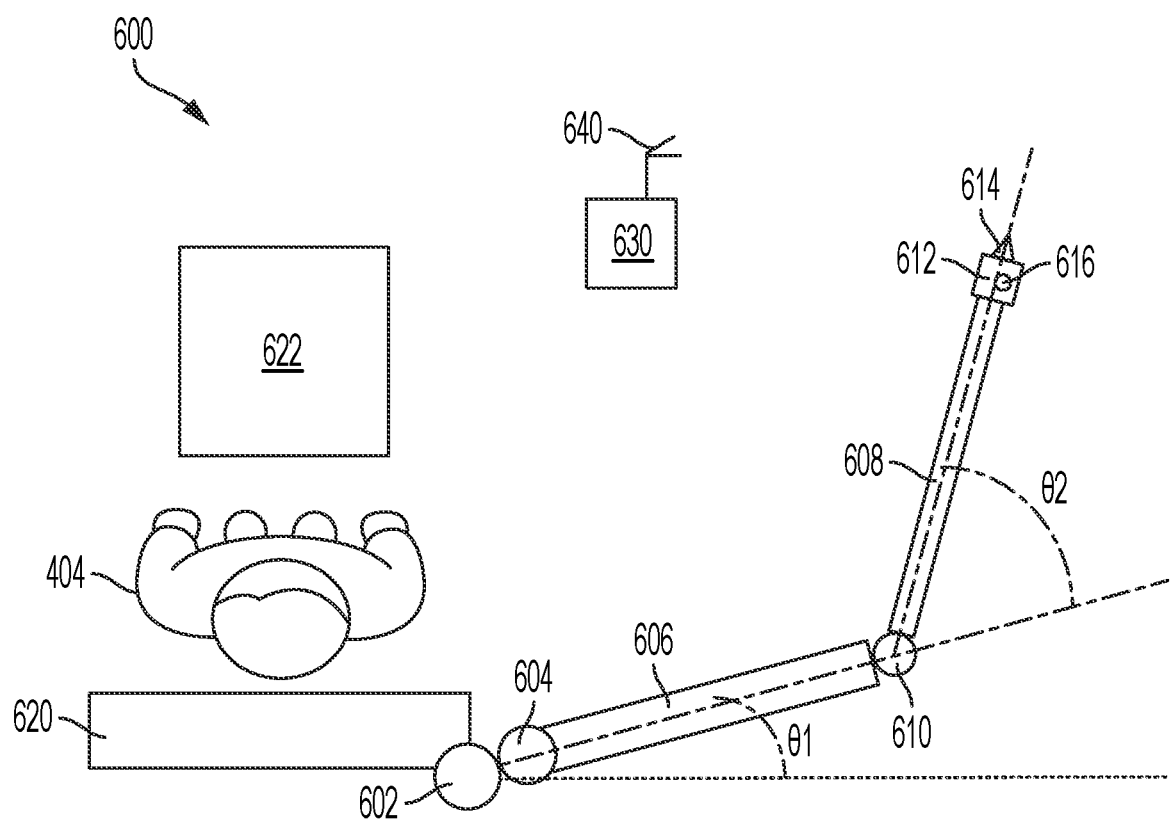
FIG. 6 is a schematic of an SRL environment for assisting a user to perform a task according to one example of the present disclosure.

FIG. 6 is a schematic of a SRL environment 600 for assisting a user 404 to perform a task according to one example of the present disclosure. The SRL environment 600 can include the user 404, an SRL system, a workspace 622, and a computing device 630. In some examples, the SRL system can be an SRL system like the SRL system depicted in FIG. 4. The SRL system can include a first VSA 602, a second VSA 604, a first rigid arm 606, a second rigid arm 608, a joint 610, an end-effector 612, a tool 614, and at least one sensor 616. The at least one sensor 616 is positioned on the end-effector 612 in FIG. 6, but in other examples, the at least one sensor 616 can be positioned in other locations associated with the SRL environment 600 such as on the second rigid arm 608.

The first rigid arm 606 and the second rigid arm 608 can be driven and rotated by the first VSA 602 and the second VSA 604. Rigid arms, as described herein, can also be referred to as links or rigid links. Lengths of the first rigid arm 606 and the second rigid arm 608 can be selected to ensure that the SRL system can reach the workspace 622 to perform the task without invading the space occupied by the user 404. A movement of the first rigid arm 606 can be described by a first joint angle θ1 and a movement of the second rigid arm 608 can be described by a second joint angle θ2. Maximum values of the first joint angle θ1 and the second joint angle θ2 can be chosen and enforced to ensure that the SRL system does not collide with any part of the user 404. To minimize the inertia of the SRL system, the first VSA 602 and the second VSA 604 can be positioned near one end of the first rigid arm 606. The first VSA 602 can be mounted directly on a base of the SRL system. A shaft of the first VSA 602 can hold the second VSA 604 and the first rigid arm 606. A harness 620 can be attached to the base of the SRL system. The harness 620 can attach the SRL system to the user 404.

The joint 610 can connect the first rigid arm 606 to the second rigid arm 608. Both the first rigid arm 606 and the second rigid arm 608 can be composed of carbon-fiber tubes, aluminum, or a mixture of carbon-fiber tubes and aluminum. The first VSA 602 can drive the first rigid arm 606 and the second VSA 604 can drive the second rigid arm 608 through a timing-belt mechanism. A mounting for the SRL system can be made of Aluminum. The mounting can be linear and include tilted slots to allow the user 404 to manually fix the SRL system to a predetermined operational plane.

The second rigid arm 608 can include the end-effector 612. The at least one sensor 616, which is shown on the end-effector 612, can be communicatively coupled to the computing device 630. The at least one sensor 616 can be at least one limit switch and can provide trajectory information, such as location information and velocity information, for the computing device 630. The computing device 630 can control movements of the SRL system based on the trajectory information. In some examples, the at least one sensor 616 can detect a collision with the user 404 and notify the computing device 630 of the collision and provide data associated with the collision. The computing device 630 can implement a post-collision reaction strategy based on the data associated with the collision received from the at least one sensor 616

The end-effector 612 can also include the tool 614 attached to one end of the end-effector 612. In some examples, the tool 614 can be an actuated knife that can assist the user 404 in performing a bimanual task such as eating with a fork and knife. The tool 614 can be mounted on a spherical joint with three degrees of freedom whose axes intersect at a single point. An orientation of the tool 614 can be manually modified by the user 404 prior to performing the task. In some examples, a linear actuator can generate reciprocating movements of the knife. The reciprocating movements can be controlled by the user 404 through a push-button located by a foot of the user 404.

In some examples, the SRL environment 600 can include the computing device 630. As illustrated with respect to FIG. 6, the computing device 630 is positioned near the workspace 622 but can be positioned in any other suitable location including remote to the SRL environment 600. The computing device 630 can include a processor interfaced with other hardware via a bus. A memory, which can include any suitable tangible (and non-transitory) computer-readable medium, such as random-access memory (RAM), read-only memory (ROM), electrically erasable and programmable read-only memory (EEPROM), or the like, can embody program components (e.g., a display, printer, keyboard, touch-sensitive surface, and mouse) and additional storage. The computing device 630 can be communicatively coupled to any suitable component such as the at least one sensor 616, the first VSA 602, or the second VSA 604 of the SRL environment 600 (e.g., via a wireless connection or a wired connection).

The computing device 630 can include a communication device 640. The communication device 640 can represent one or more of any components that facilitate a network connection. In the example illustrated in FIG. 6, the communication device is wireless and can include wireless interfaces such as IEEE 802.11, BLUETOOTH™, or radio interfaces for accessing cellular telephone networks (e.g., transceiver/antenna for accessing a code-division multiple access (CDMA), Global System for Mobile (GSM) communication, Universal Mobile Telecommunications Service (UMTS), or other mobile communications network). In some examples, the communication device 640 can be wired and can include interfaces such as Ethernet, USB, IEEE 1394, or a fiber optic interface. In an example with at least one other computing device, the computing device 630 can received wired or wireless communications from the other computing device and perform one or more tasks based on the communications and with respect to the SRL environment 600. For example, the computing device 630 (or a non-transitory computer-readable medium included in the memory of the computing device 630, etc.) can perform the operations, or a subset thereof, described with respect to techniques disclosed herein (e.g., receiving information from the at least one sensor 616, controlling movements of the SRL system based on the information from the at least one sensor 616, implementing a post-collision reaction strategy based on the information from the at least one sensor 616, etc.).

Figure 7:
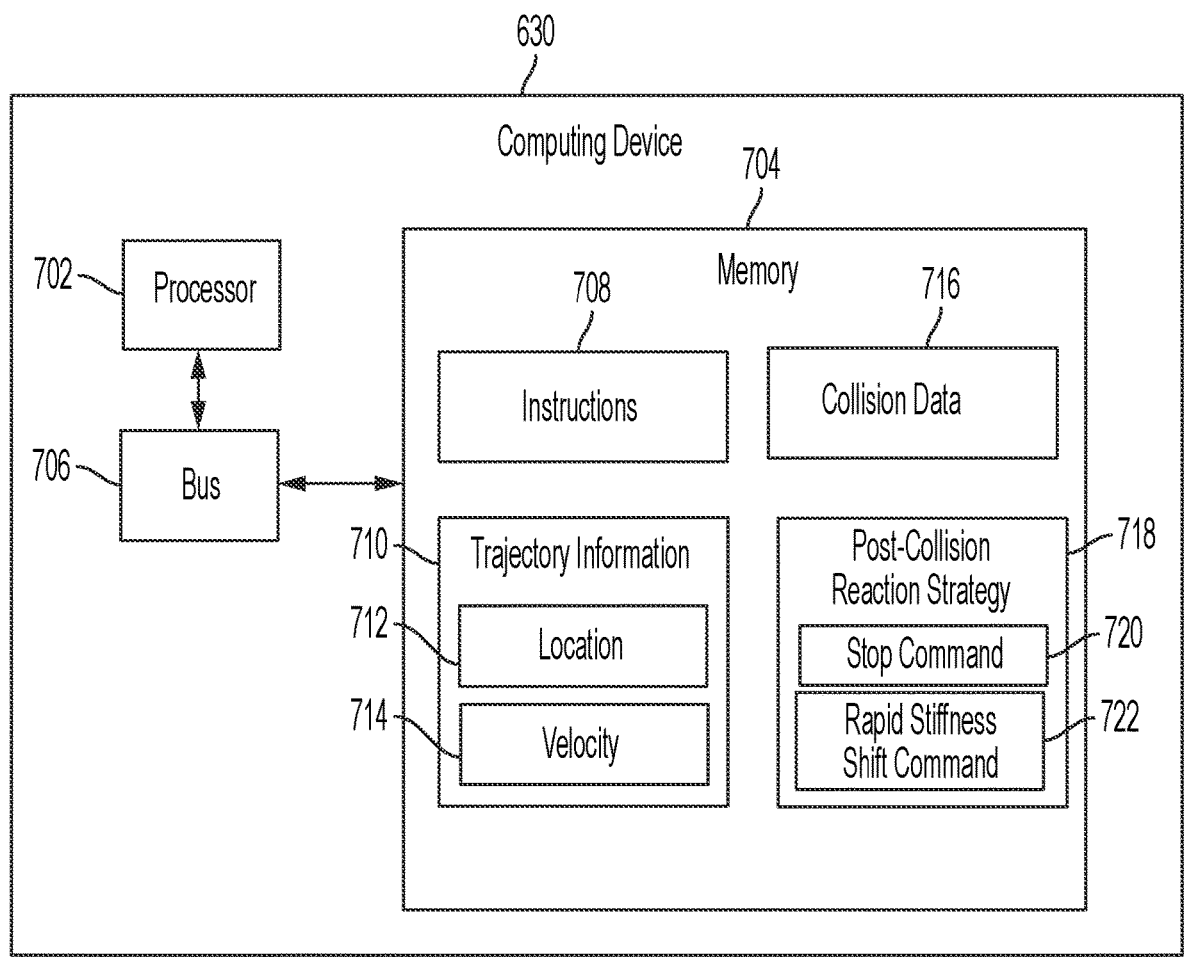
FIG. 7 is a block diagram of a computing device for controlling movements of an SRL system according to one example of the present disclosure.

FIG. 7 is a block diagram of a computing device 630 for controlling movements of an SRL system according to one example of the present disclosure. An example of the computing device 630 can be computing device 630 from FIG. 6. The components shown in FIG. 7, such as a processor 702, a memory 704, a bus 706, and the like, may be integrated into a single structure such as within a single housing of the computing device 630. Alternatively, the components shown in FIG. 7 can be distributed from one another and in electrical communication with each other.

FIG. 7 is a block diagram of a computing device 630 for controlling movements of an SRL system according to one example of the present disclosure. An example of the computing device 630 can be computing device 630 from FIG. 6. The components shown in FIG. 7, such as a processor 702, a memory 704, a bus 706, and the like, may be integrated into a single structure such as within a single housing of the computing device 630. Alternatively, the components shown in FIG. 7 can be distributed from one another and in electrical communication with each other.

As shown, the computing device 630 includes the processor 702 communicatively coupled to the memory 704 by the bus 706. The processor 702 can include one processor or multiple processors. Non-limiting examples of the processor 702 include a Field-Programmable Gate Array (FPGA), an application specific integrated circuit (ASIC), a microprocessor, or any combination of these. The processor 702 can execute instructions 708 stored in the memory 704 to perform operations. In some examples, the instructions 704 can include processor-specific instructions generated by a compiler or an interpreter from code written in any suitable computer-programming language, such as C, C++, C#, or Java.

The memory 704 can include one memory device or multiple memory devices. The memory 704 can be non-volatile and may include any type of memory device that retains stored information when powered off. Non-limiting examples of the memory 704 include electrically erasable and programmable read-only memory (EEPROM), flash memory, or any other type of non-volatile memory. At least some of the memory 704 can include a non-transitory computer-readable medium from which the processor 702 can read instructions 708. The non-transitory computer-readable medium can include electronic, optical, magnetic, or other storage devices capable of providing the processor 702 with the instructions 708 or other program code. Non-limiting examples of the non-transitory computer-readable medium include magnetic disk(s), memory chip(s), RAM, an ASIC, or any other medium from which a computer processor can read instructions 708.

Additionally, the memory 704 can further include trajectory information 710, collision data 716, and a post-collision reaction strategy 718. The trajectory information 710 can include location 712 information and velocity 714 information. The post-collision reaction strategy 718 can include a stop command 720 and a rapid stiffness shift command 722. The computing device can receive the trajectory information 710 and collision data 716 from at least one sensor 616 of the SRL system. The processor 404 can control movements of the SRL system based on the information received from the at least one sensor 616. For example, the processor 702 can detect a collision of the SRL system and implement the post-collision reaction strategy 718 based on the collision data 716 received from the at least one sensor 616. In some examples, the processor 702 can implement the post-collision reaction strategy 718 by sending the stop command 720 to at least one VSA 100 of the SRL system. The SRL system can be stopped by providing no input torque to a motor of the at least one VSA 100 once the collision is detected by the processor 702. In another example, the processor 702 can implement the post-collision reaction strategy 718 by sending the rapid stiffness shift command 722 to the at least one VSA 100. The rapid stiffness shift command 722 can cause the at least one VSA 100 to undergo a rapid shift from high to low stiffness once the collision is detected. In some examples, the processor 702 can implement the post-collision reaction strategy 718 by sending the rapid stiffness shift command 722 and the stop command 720 to the at least one VSA 100.

Figure 8:
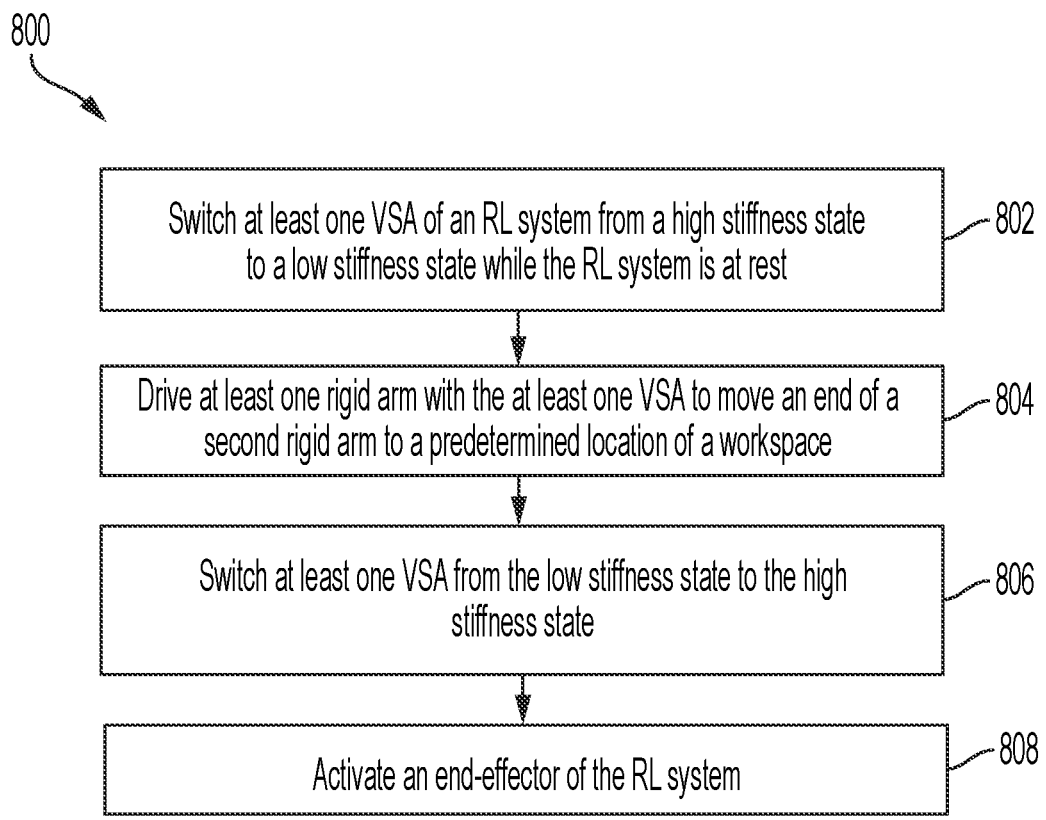
FIG. 8 is a flowchart depicting a process for performing a task by an SRL system that includes at least one VSA that exhibits infinite rotation and infinite stiffness according to one example of the present disclosure.

FIG. 8 is a flowchart depicting a process 800 for performing a task by an SRL system that includes at least one VSA 100 that exhibits infinite rotation and infinite stiffness according to one example of the present disclosure. Operations of flowcharts may be performed by software, firmware, hardware, or a combination thereof. The operations of the flowchart start at block 802.

At block 802, the process 800 involves switching at least one VSA of an SRL system from a high stiffness state to a low stiffness state while the SRL system is at rest. The stiffness of the at least one VSA 100 can be switched to a low state when the SRL system moves from one state to another to ensure safety of a user 404. When operating at low stiffness, the safety of the user 404 can be ensured through a capability of shock absorption due to an increased elasticity of the VSA while in a low stiffness state. The transition from high to low stiffness in the VSA 100 can be accomplished by changing a position of a force contact point 120 within the VSA towards a center of rotation 304 of the VSA 100.

At block 804, the process 800 involves driving at least one rigid arm with the at least one VSA to move an end of a second rigid arm 608. A first VSA 602 can drive a first rigid arm 606 and a second VSA can drive the second rigid arm 608 through a timing belt mechanism. A computing system 630 in an SRL environment 600 can control the motion of the second rigid arm 608 based on trajectory information 710 received from at least one sensor 616. In some examples, the motion of the second rigid arm 608 due to driving the at least one rigid arm can be controlled by other methods. The other methods can include teleoperation (direct or bilateral), methods involving bio-sensing feedback (e.g., eye-tracking, brain-machine-interface, electrocardiogram ECG, or Electromyography EMG), vision-based control methods, etc. In some examples, when the second rigid arm 608 arrives at a predetermined location of the workspace 622, the SRL system can stop moving.

At block 806, the process 800 involves switching the at least one VSA 100 from the low stiffness state to the high stiffness state. Accuracy in performing a task can be improved when operating in the high stiffness state. The transition from low to high stiffness in the VSA 100 can be accomplished by changing a position of a force contact point 120 within the VSA away from the center of rotation 340 of the VSA 100 and towards a point 310 along the base center line 306 of a set of elastic elements in the VSA 100.

At block 808, the process 800 involves activating an end-effector 612 of the SRL system. In some examples, at least one task such as eating with a fork and knife can be performed. The end-effector 612 can include a tool 614 such as an actuated knife and the activating the end-effector 612 can cause a reciprocating knife cutting process to occur. The user 404 can press on a push button with a foot to initiate and maintain the knife cutting process. The knife cutting process can proceed until the user releases the push button by lifting the foot.

Figure 9:
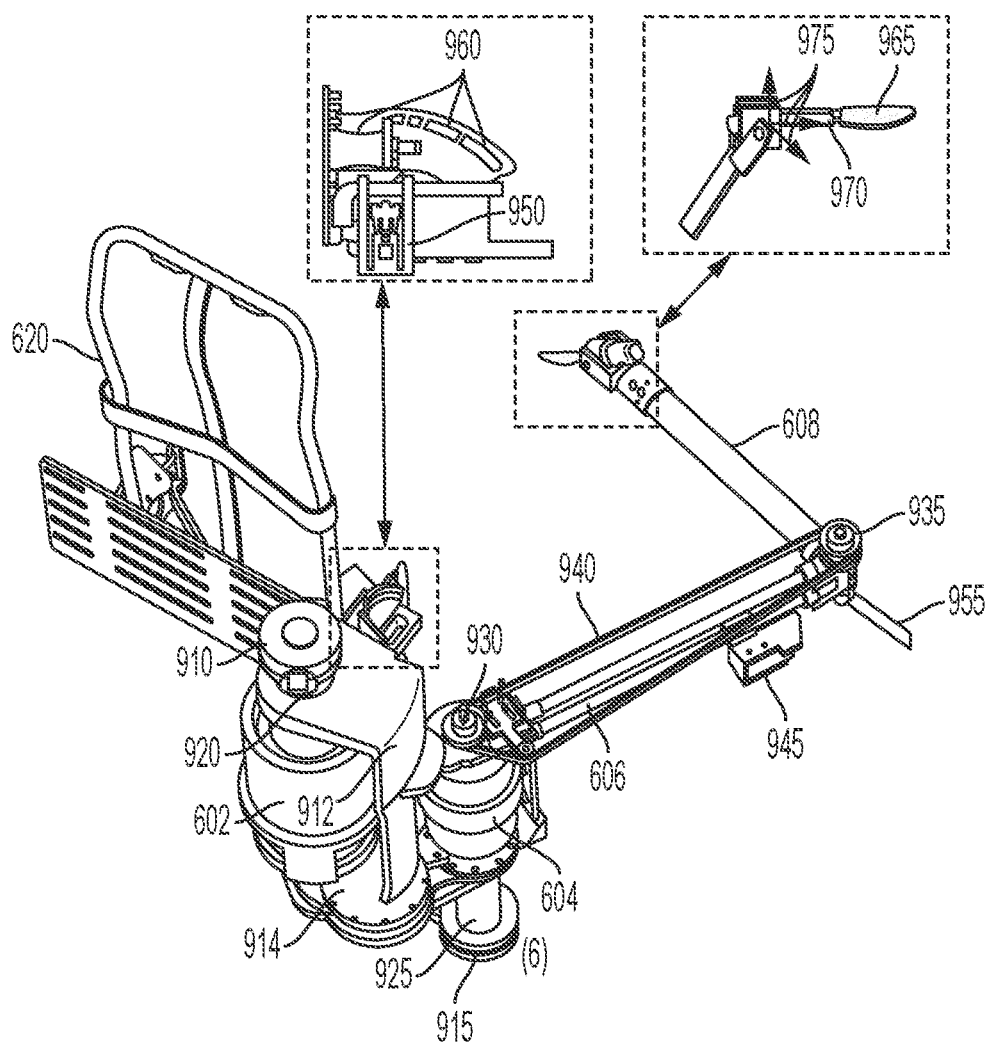
FIG. 9 is a perspective view of an SRL that incorporates VSAs according to one example of the present disclosure.

FIG. 9 is a perspective view of an SRL that incorporates VSAs 100 according to one example of the present disclosure. The SRL can include a first motor 910, a shaft 912, a base 914, a second motor 915, a first gearbox 920, a second gearbox 925, a first VSA 602, a second VSA 604, a first pulley 930, a second pulley 935, a timing belt 940, a first rigid arm 606, a second rigid arm 608, a first limit switch 945, a second limit switch 950, a limiter 955, a tilting mechanism 960, a knife blade 965 (although other end effector are possible and can depend on the task to be performed), a linear actuator 970, adjustable axes 975, and a harness 620. The design and development of the VSA-based SRL have three main components: a development of the VSAs, a design of the first arm 606 and the second arm 608, and the development of an end-effector. The first limit switch 945 and the second limit switch 950 can act as sensors. In some examples, the first rigid arm 606 and the second rigid arm 608 can be referred to as links.

The first VSA 602 and the second VSA 604 can each tune the stiffness by altering a transmission between an elastic element and an output link. The transmission can be realized through a line mechanism which allows the tuning of stiffness to physically achieve a broad spectrum from low levels (70 N·m/rad) to significantly high levels (8000 N·m/rad) within a minimal stiffness altering time (500 ms). When operating at low stiffness, safety can be ensured through the capability of shock absorption due to a relatively high elasticity of each VSA. Accuracy in performing tasks can be ensured when operating at high stiffness levels as the utilized VSA operates similarly to a rigid actuator. The utilized VSAs can each have two motors; a first motor (Maxon Brushless DC Motors EC90 with planetary gearbox 91:1 ratio, embedded 2048 pulses-per-revolution (PPR) resolution Encoder, and EPOS drive controller can be responsible for altering an equilibrium point of an output link, while a second motor (Dynamixel M64 with Arbotix Controller) can drive a stiffness tuning line-mechanism. A Linear Potentiometer can be utilized as feedback for states of the line-mechanism.

A mechanical design of the SRL is depicted in FIG. 9. The figure shows that the SRL consists of the first arm 606 and the second arm 608 driven by the first VSA 602 and the second VSA 604. To minimize a weight of the SRL, the first arm 606 and the second arm 608 can be made from carbon-fiber tubes and Aluminum. Furthermore, to minimize an inertia of the SRL, a location of the first VSA 602 can be selected directly on a base of the SRL. The first VSA 602 can be mounted directly on the base, and a shaft of the first VSA 602 can hold the second VSA 604 and the first arm 606. The second VSA 604 can controls the second arm 608 via the timing-belt 940. A mounting of the SRL can be made of Aluminum. The mounting can have linear and tilted slots to allow a user 404 to manually fix the SRL with a predetermined operational plane. The first limit switch 945 and the second limit switch 950 can be included in the SRL to create a homing routine. The homing routine is necessary as joint angles can be measured via incremental encoders (e.g., CUI AMT102V with 2048 PPR resolution).

An end effector consists of the knife blade 965 mounted on a passive, 3 degrees of freedom, spherical joint with the adjustable axes 975 that can intersect at a single point. The knife blade 965 can be an actuated knife. An orientation of the knife blade 965 can be adjusted by the user 404 using a healthy hand prior to cutting. The linear actuator 970 can generate reciprocating movements of the knife blade 965, which the user 404 can control through a push-button pressed by their foot.

Figure 10:
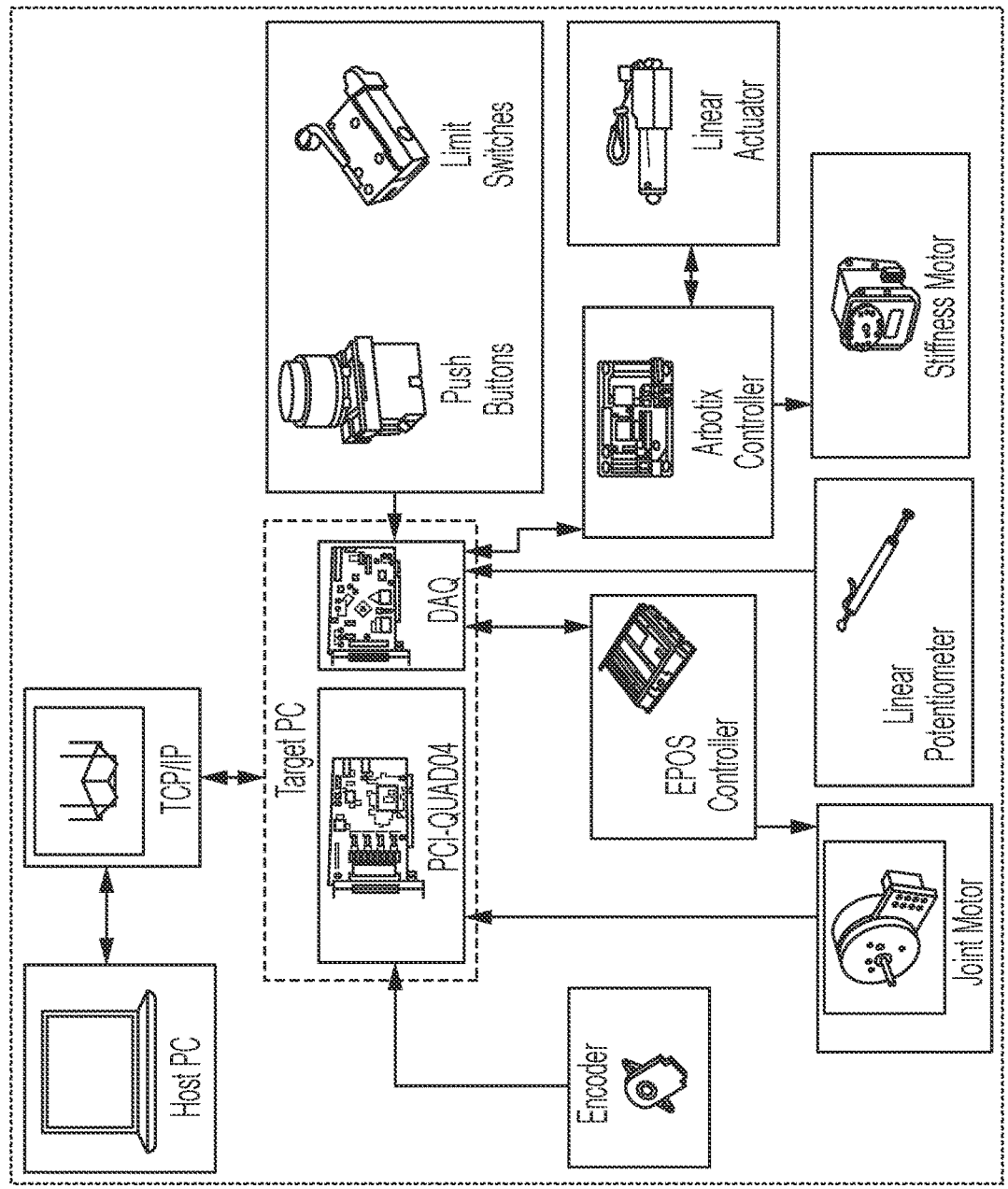
FIG. 10 is a schematic of an experimental setup used to control and analyze an SRL that incorporates VSAs according to one example of the present disclosure.

FIG. 10 is a schematic of an experimental hardware setup used to control and analyze an SRL that incorporates VSAs according to one example of the present disclosure. The experimental hardware setup incorporates several components, which are integrated as elucidated in FIG. 10. The hardware setup consists of a host computer and a target computer, which communicate through TCP/IP. The target computer contains a data acquisition device (e.g., DAQ: NI PCI-6221M) and a Quadrature Encoder Board (e.g., PCI-QUAD04). The data acquisition device can communicate with drivers of VSA motors (e.g., joint motors (Maxon EC90) and stiffness tuning motors (Dynamixel M64) can be driven by EPOS 24/5 and Arbotix, respectively). The data acquisition device can be connected with limit switches, linear potentiometers, and push buttons. The Quadrature Encoder Board can be connected to an embedded encoder in the VSA motors and in joint encoders. A linear actuator of a knife can be controlled through an Arbotix driver.

A controller program can be implemented in a MATLAB/SIMULINK environment on a host computer. A controller can be transferred to a target computer and executed in a Simulink Real-Time environment (e.g., MATLAB xPC). The TCI/IP communication between the host and a target computer can operate at 100 Mbps. The data acquisition device can execute the controller and communicate command signals to the motor drivers through Analogue Inputs (for the EPOS), PWM Digital Outputs (for the Dynamixel), and digital outputs for the linear actuator. The linear actuator can be preprogrammed to perform reciprocating movements through the Arbotix driver. Feedback data from the linear potentiometers can be read by the data acquisition device through Analogue Inputs, while the limit switches and the push buttons can be read as Digital Inputs. Motor positions can be read through the Quadrature Encoder Board. A data exchange rate between a sensory system, the motor drives, and the target computer can be 1000 samples per second.

During the compensation process of the SRL, the patient's safety must be ensured, mainly due to the proximity of the SRL and the hemiplegic patient. Operating at low stiffness would ensure safety as it would enable the feature of shock absorption. Compared with rigid actuator-based SRL, the proposed SRL would be able to operate at higher velocities with a similar level of safety which would enhance the performance of the process. In order to ensure safety in post-collision scenarios, the collision should be detected, and a post-collision reaction strategy should be followed. A momentum observer was adapted for collision detection in this work, and several reaction strategies were evaluated via the soft tissue injury test. The detailed illustration of the process is as follows:

Using a dynamic model, dynamic parameters of the SRL were estimated using Parameter Estimation Toolbox in SIMULINK MATLAB. The estimated dynamic parameter values are used in a collision detection observer. A momentum observer is used for detecting collisions during Human Robot Interaction (HRI) applications. Based on a dynamic model, the momentum observer can be designed as following:

$$r = K_0 \left[ p(t) - p(0) - \int_0^t \left( \tau_\Phi - F_{rl} - F_{rj} - \hat{\beta}(\theta, \dot{\theta}) + r \right) dt \right] \quad (1)$$

where p is the momentum, which is defined as $p=M_1(\theta)\dot{\theta}+M_2\dot{\phi}$, and $\beta(\theta, \dot{\theta})=g(\dot{\theta})-C_\theta^T\dot{\theta}$. $K_0$ is a positive diagonal gain matrix.

The residual signal r is used to detect the collision. In experiments, selecting an appropriate threshold is important to increase accuracy of collision detection. The threshold of the residual r can be set as follows:

$$\epsilon_r = \hat{r}_{max} + \epsilon_c \quad (2)$$

where $\hat{r}_{max}$ is a maximum value of a collision detection signal during movement of the SRL without any external collision event. $\epsilon_c$ is a small constant to avoid false detection.

The dynamic relation between the external collision torque $\tau_{ext}$ and r is given as $$\dot{r} = K_0(\tau_{ext} - r) \quad (3)$$

which is a first-order, stable filter of the unknown collision torque $\tau_{ext}$. For a large $K_0$, the residual r follows closely the time behavior of $\tau_{ext}$ and in particular returns to zero when contact is lost. This means:

$$K_0 \to \infty \text{ when } r \approx \tau_{ext} \quad (4)$$

This character allows the momentum observer to behave like a virtual sensor for external joint torques performing on the robot structure.

Accurate collision detection can demand the use of appropriate thresholds $\epsilon_r \in R^{2 \times 1}$ for robustness. A collision detection function cd(·) maps the collision signal r into two different detection results: TRUE or FALSE. This can be mathematically modeled as:

$$cd(r(t)) = \begin{cases} \text{TRUE, if } |r(t)| > \epsilon_r \\ \text{FALSE, if } |r(t)| \leq \epsilon_r \end{cases} \quad (5)$$

Under the ideal situation, $\epsilon_r=0$, however, due to torque measurement noise of motors, position and velocity measurements noise, and dynamic modeling uncertainties, the threshold of residual r is not practically zero. Therefore, as soon as the residual signal r exceeds the threshold ($\epsilon_r$=8-20 Nm), a subroutine program activates that contains a post-collision reaction strategy (described below) which aims to minimize the harm to human users and the robot structures.

A control law for gravity compensation can be given as follows:

$$\tau_\phi = K_p(\theta_d - \theta) - K_d\dot{\theta} + g(\theta_d) \quad (6)$$

where $K_p$=diag (100, 120) and $K_d$=diag (20, 20) are symmetric positive definite matrices, and $g(\theta_d)$ is a vector of gravitational torques.

In order to manifest the advantages of utilizing variable stiff-ness actuators in SRL systems, two different post-collision reaction strategies are proposed. The zero-torque mode is the first reaction strategy where the SRL would be stopped by providing no input torque to the motors once the collision is detected. In this strategy, the level of stiffness is constant (high or low). The second strategy would combine the zero-torque mode with a rapid shift from high to low stiffness once the collision is detected.

Figure 11:
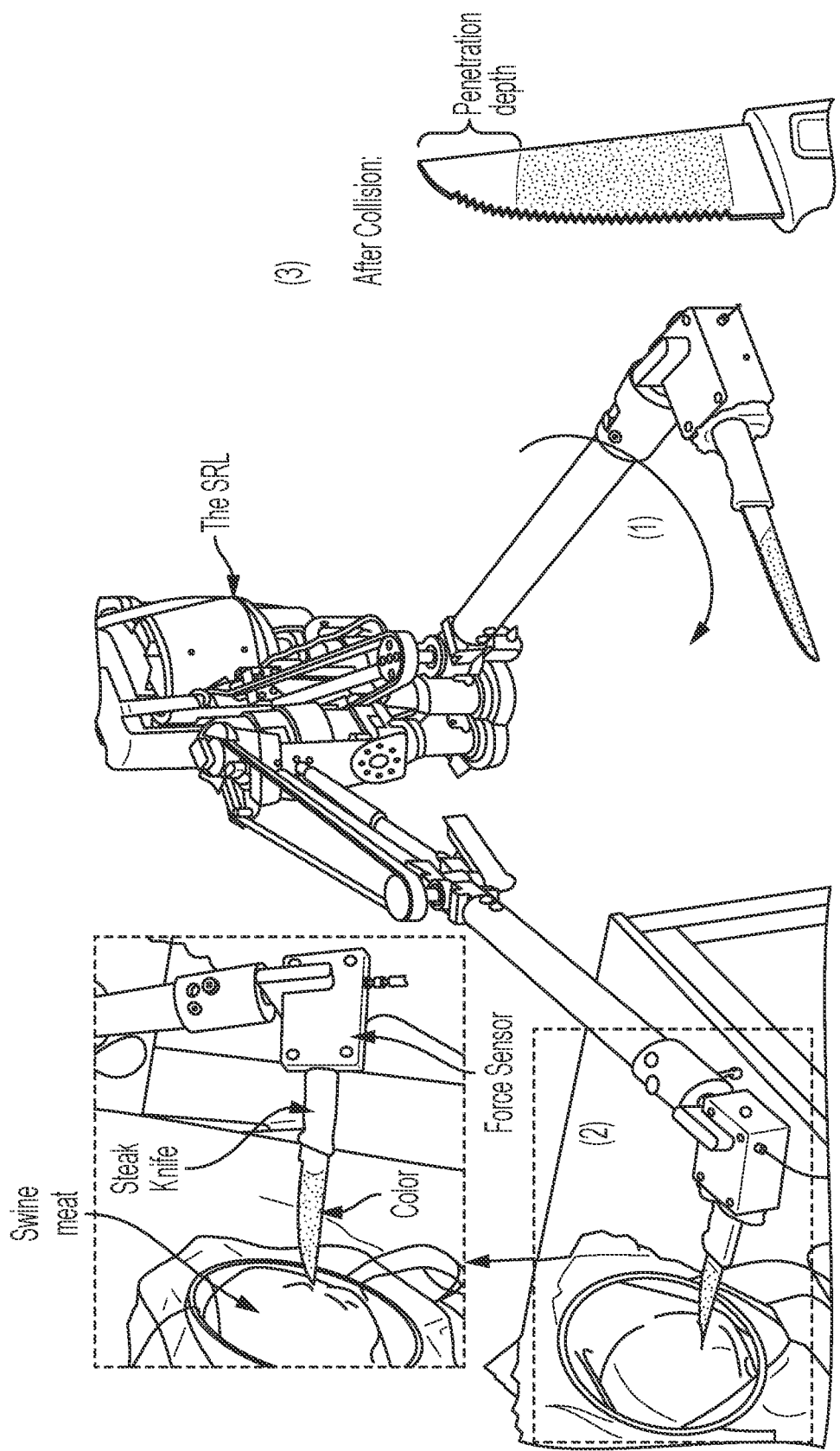
FIG. 11 is a schematic of an experimental setup used to control and analyze safety experiments for an SRL that incorporates VSAs according to one example of the present disclosure.

FIG. 11 is a schematic of an experimental setup used to control and analyze safety experiments for an SRL that incorporates VSAs according to one example of the present disclosure. The safety experiment procedure includes different components annotated: (1) the SRL would be set on a predefined trajectory to perform stabbing. The knife is rigidly attached to a Force sensor (e.g., Vernier dual-range), and the blade is colored by a special color (red). (2) A piece of swine meat is placed along the SRL's predefined trajectory such that it would be stabbed by the steak knife. (3) After a collision, a penetration depth is measured manually and can be indicated by the wiped red color from the knife; a Force Value is read from the force sensor. Soft tissue injury tests were implemented to assess the possible risk associated with the use of a sharp knife. Experimental objectives included defining the maximum operating velocity of the end-effector such that it would avoid any penetration of the knife into a body of a user 404. Through this test, the SRL would be equipped with a sharp tool (steak knife) and programmed to stab a piece of swine meat at different stabbing velocities and operating stiffness levels. The two criteria acquired in this test to assess safety are the penetration force (Fp) and depth (dp). As shown in FIG. 6, a force sensor (Vernier dual-range Force Sensor) which is mounted on the end-effector, is used to measure the penetration force. The knife's blade was painted with special paint that will be wiped away during the penetration to measure the penetration depth.

In order to evaluate the safety of VSA-based-SRL and compare it with Rigid-actuator-based SRLs, the SRL performed the stabbing of the swine meat at different velocities for three cases; (1) operating at low stiffness (70 Nm/rad)→collision detected→zero-torque mode strategy activated. (2) Operating at high stiffness (8000 Nm/rad)→collision detected→zero-torque mode reaction strategy activated, and (3) operating at high stiffness→collision detected→(zero-torque mode and rapid decrease in stiffness level strategy activated). It is worth mentioning that case (2) is performed as a reference to compare the performance of the VSA with rigid actuators.

Figure 12A:
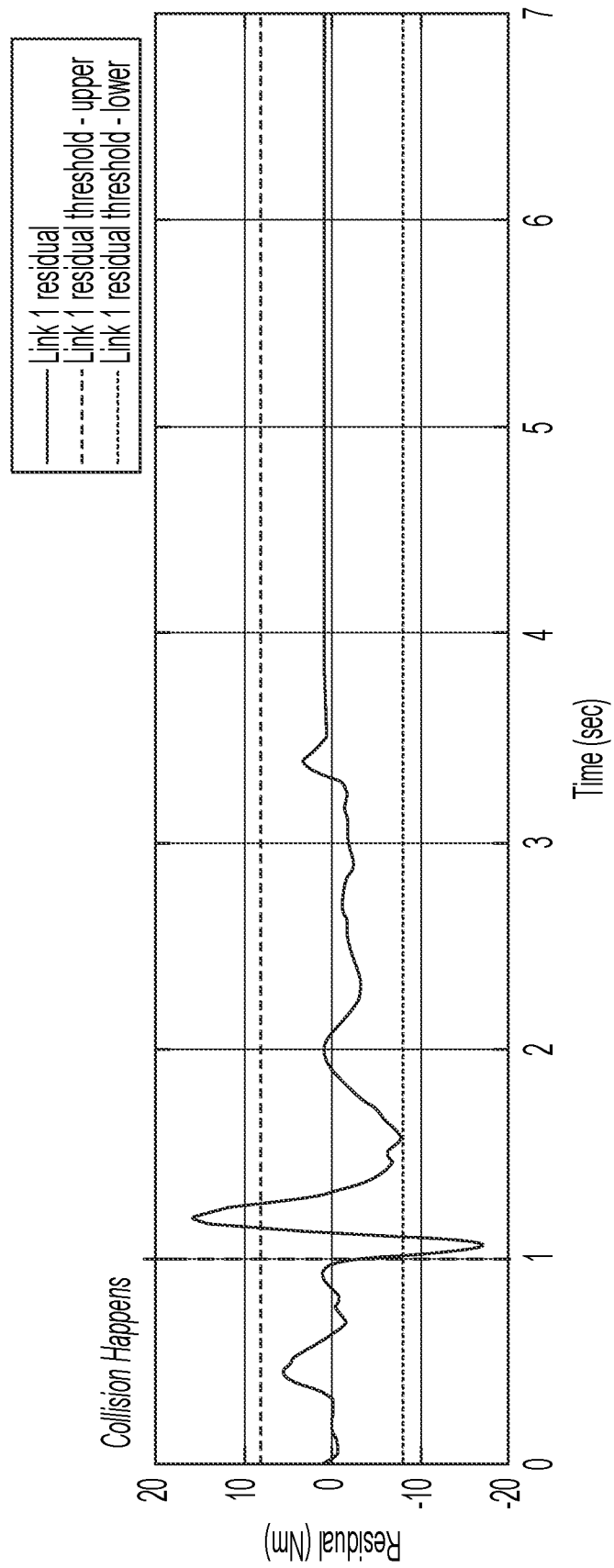
FIGS. 12A, 12B, and 12C are a set of graphs that illustrate results of a forced dynamic collision for an SRL that incorporates VSAs according to one example of the present disclosure.
Figure 12B:
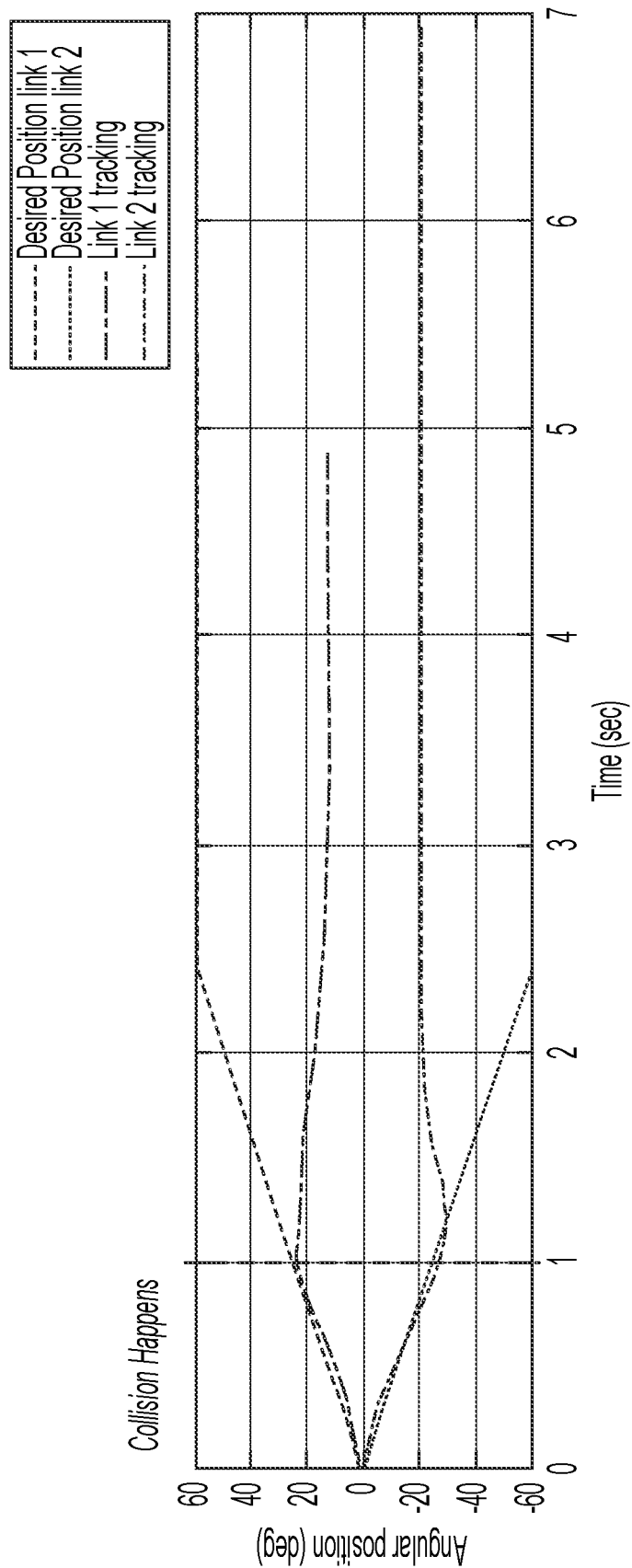
Figure 12C:
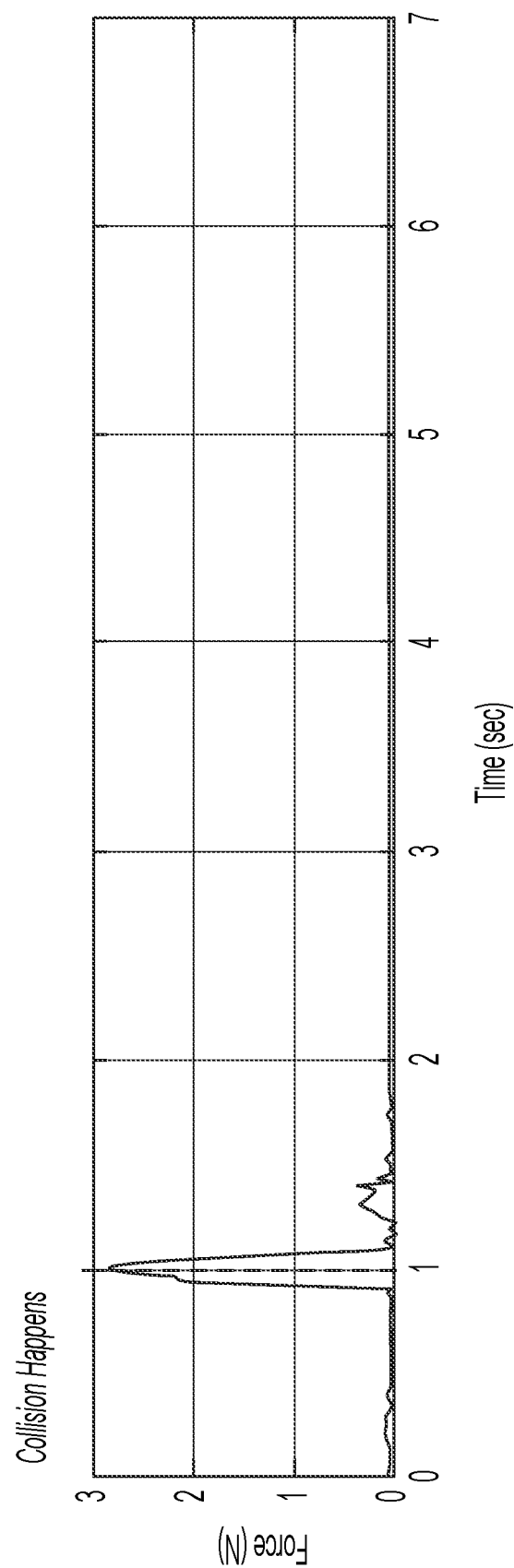

FIGS. 12A, 12B, and 12C is a set of graphs that illustrate results of a forced dynamic collision for an SRL that incorporates VSAs according to one example of the present disclosure. FIG. 12 illustrates the results of the forced dynamic collision at low stiffness mode (case (1)). The momentum observer's residual signal (r) is under the threshold before the collision occurs, and the manipulator keeps tracking the reference (see FIG. 12A). Once the collision is detected, the system is switched to the zero-torque mode, which would stop the manipulator and prevent it from following its desired trajectory (see FIG. 12B). The penetration force is recorded during the collision (see FIG. 12C), while the penetration depth is measured manually after the collision.

Figure 13:
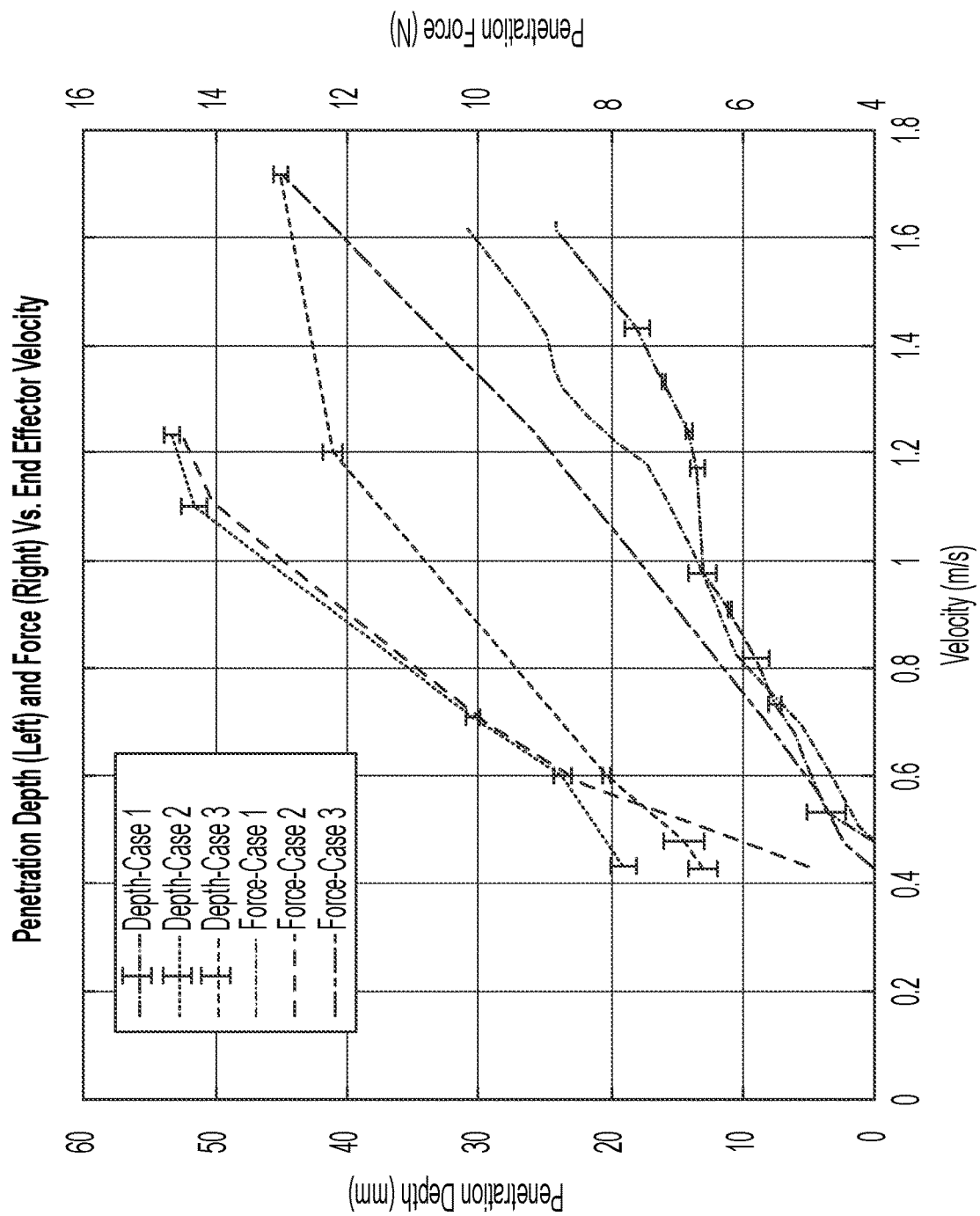
FIG. 13 is double y graph of penetration depth and penetration force versus end-effector velocity for an SRL that incorporates VSAs according to one example of the present disclosure.

FIG. 13 is double y graph of penetration depth and penetration force versus end-effector velocity for an SRL that incorporates VSAs according to one example of the present disclosure. Experiments were conducted for three cases at different velocities. The results are illustrated in FIG. 13. In all cases, the penetration depth and the force increased drastically with the increase of the end-effector's velocity, which confirms that the velocity should be constrained to avoid severe harm to the users. The high stiffness case (case (2)) always has the highest penetration depth and force no matter in low or high velocities, which means that rigid actuators would impose higher risks of injury if utilized at similar velocities compared with VSA (cases (1) and (3)). The comparison between case (1) and case (3) also shows that operating at low stiffness prior to the collision would ensure safety better than swiftly switching to low stiffness once the collision is detected. This can be referred to relatively short collision duration time (less than 60 ms) compared with the time to change the stiffness from high to low level (450 ms). In Case 1, at the velocity of (0.48 m/s), zero penetration depth and the smallest penetration force have been recorded. Therefore, it would be selected as the maximum operating velocity during the compensation process. Moreover, the stiffness control strategy should ensure that the level of stiffness should be low during the majority of the trajectory-tracking of the SRL.

Figure 14:
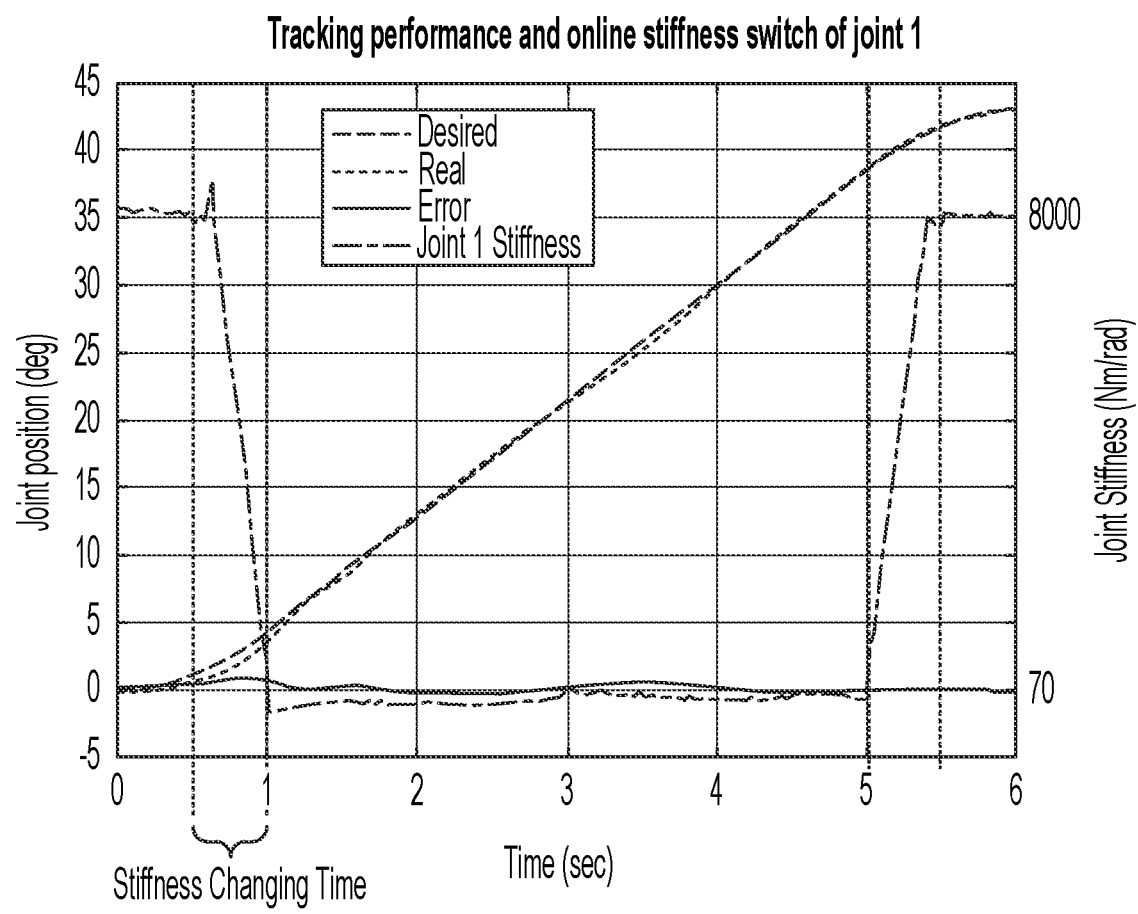
FIG. 14 is double y graph of joint position and joint stiffness versus time for a first joint of an SRL that incorporates VSAs according to one example of the present disclosure.
Figure 15:
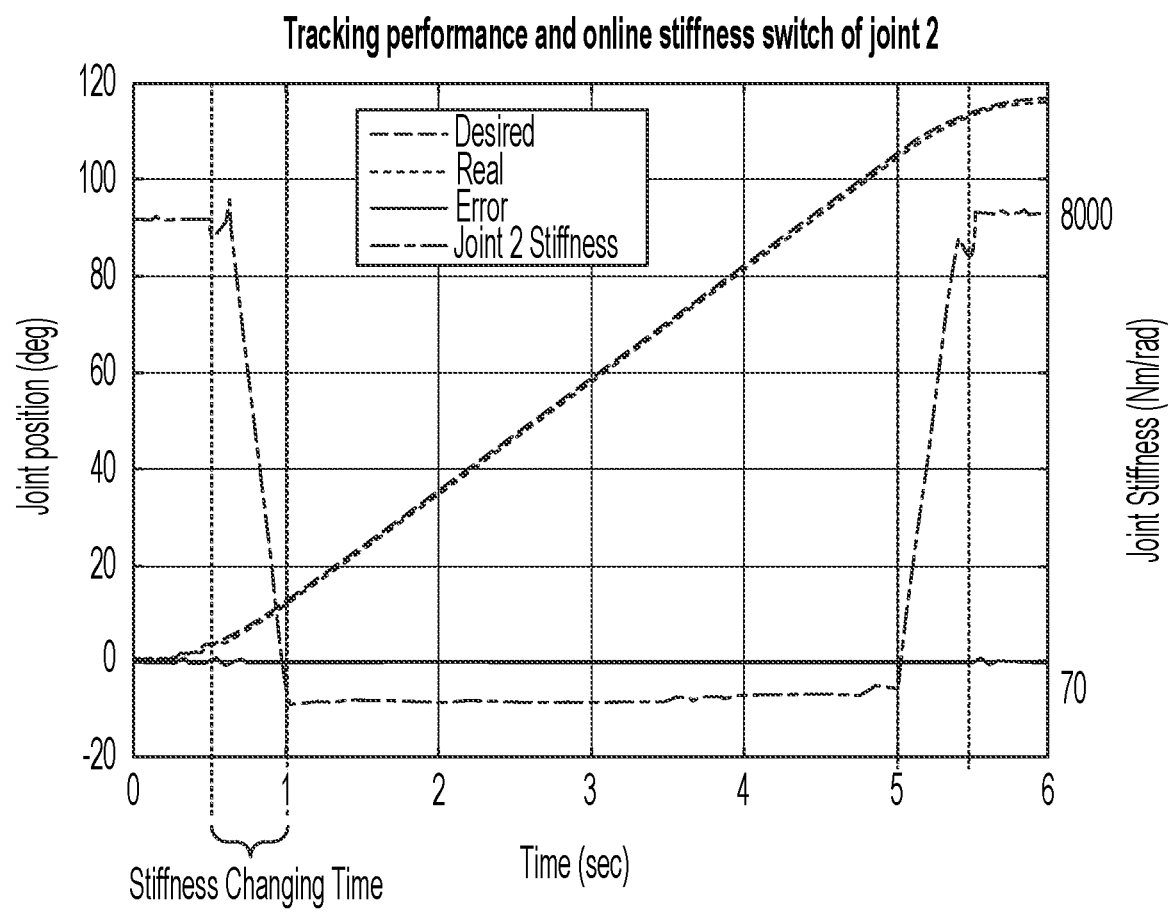
FIG. 15 is double y graph of joint position and joint stiffness versus time for a second joint of an SRL that incorporates VSAs according to one example of the present disclosure.

FIG. 14 is double y graph of joint position and joint stiffness versus time for a first joint of an SRL that incorporates VSAs according to one example of the present disclosure. FIG. 15 is double y graph of joint position and joint stiffness versus time for a first joint of an SRL that incorporates VSAs according to one example of the present disclosure. FIG. 14 and FIG. 15 illustrate an evaluation of a tracking performance of the SRL based on a P ID controller. The desired final Cartesian position [xdf=−23.62 mm; ydf=650.69 mm] of the end-effector defined in the base frame is used to calculate the desired final SRL joints [θ1df; θ2df]. A joint trajectory generator based on the trapezoidal velocity profile is adopted to generate the desired trajectory between the initial joint positions and the desired ones. The generated trajectories for both joints starting from the initial to the final positions, lie within a cooperative workspace to ensure that the robot links and end-effector do not collide with the user. The trapezoidal velocity profile contains three phases: the acceleration phase, where the acceleration is constant, the velocity is a linear function of time, and the position is a parabolic function of time; the coasting phase, where the velocity is constant and the position is a linear function of time; and the deceleration phase (the negated behavior of the acceleration). This trapezoidal velocity profile allows con-trolling the velocity and imposing a maximum acceleration. Based on the results of the previous section, the Cartesian end-effector velocity was limited to 0.4 m/s to ensure zero knife penetration in the event of any accidental collision (stabbing) with humans. The maximum joint velocities used for the trapezoidal trajectory generation respect this safety criterion, and their corresponding Cartesian velocity was calculated based on the Jacobian matrix. Two levels of stiffness were used, where the high stiffness is switched at the first half of the acceleration phase (from 0 to 0.5 sec) and the second half of the deceleration phase (from 5.5 to 6 sec). The low level of stiffness is switched from the second half of the acceleration phase to the end of the first half of the deceleration period (from 0.5 sec to 5.5 sec). The stiffness profile of both joints are illustrated in FIG. 14 and FIG. 15, the high level of stiffness is set to 8000 Nm/rad, and the low level of stiffness is set to 70 Nm/rad.

FIG. 14 and FIG. 15 illustrate the joint positions tracking, where the rms error of joints 1 and 2 are 0.3490 $deg^2$ and 0.3023 $deg^2$ and the maximum absolute errors are 0.9835 deg and 0.6940 deg respectively. Although a small mechanical backlash on joint one slightly degraded the tracking performance, which affected the final cartesian position of the end-effector (at t=6 sec), the final cartesian error of the end-effector is less than 3 mm, which is very acceptable for the targeted application.

Figure 16:
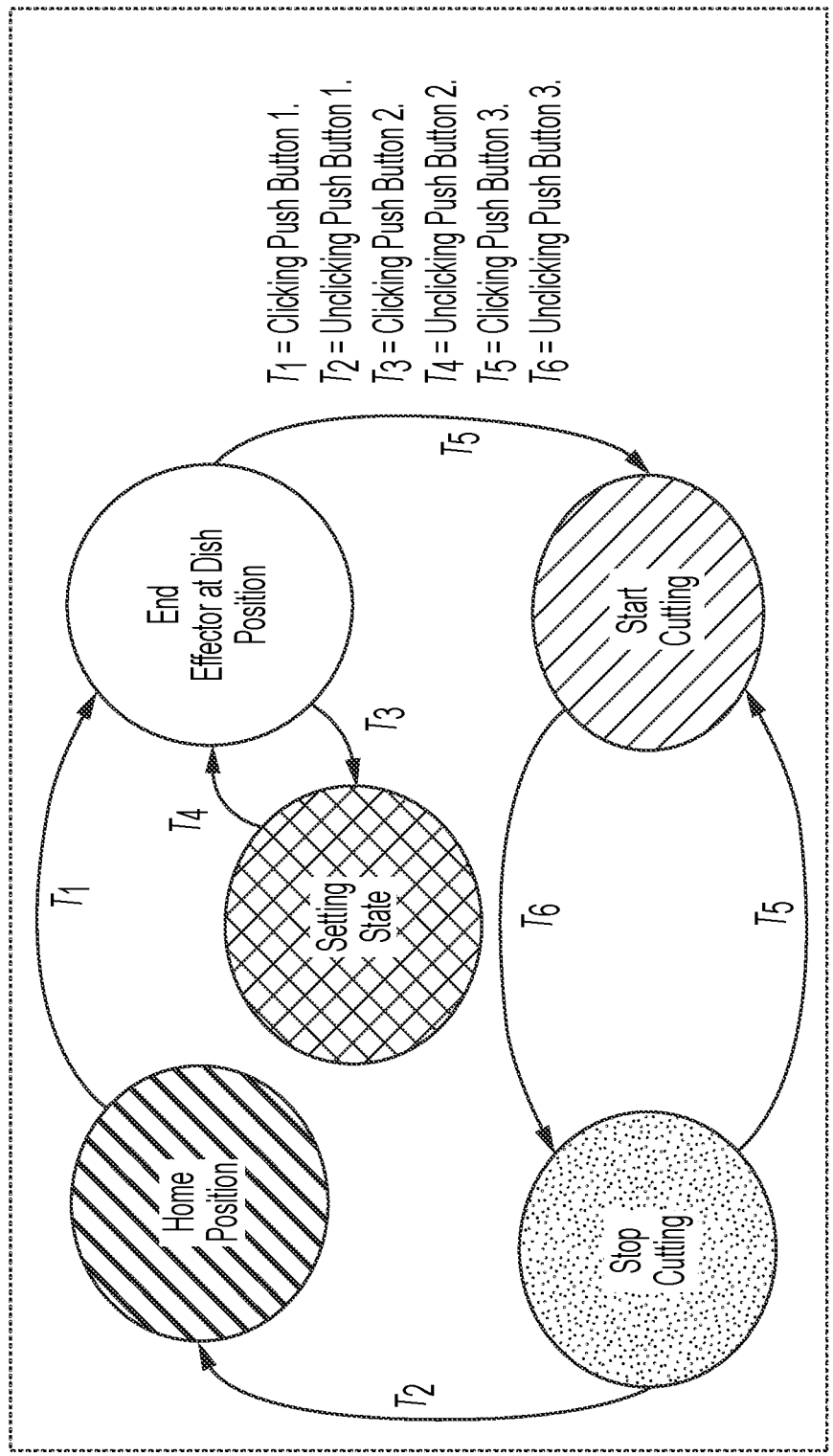
FIG. 16 is a diagram of a finite state machine used to describe an operation for an SRL that incorporates VSAs during a bimanual eating task according to one example of the present disclosure.

FIG. 16 is a diagram of a finite state machine used to describe an operation for an SRL that incorporates VSAs during a bimanual eating task according to one example of the present disclosure. The finite state machine (FSM) diagram, depicted in FIG. 11, illustrates the control of the collaborative bimanual eating task. Initially, the SRL is at the "Homing" position, representing the first state (S1). At this state, the stiffness of the actuators is set high as long as the SRL is at rest. When the user clicks a push button (B1), The SRL starts moving towards the predefined position of the dish's center (S2). The operational stiffness will be low to ensure safety through the motion between the two states. If the SRL has successfully reached the desired position, the SRL will be maintained at rest, and the stiffness will be set high to ensure accuracy. If the SRL has not reached the desired position, the patient can press the switch (B2), which would activate the Setting State (S3). In this state, the SRL would operate in gravity compensation mode to allow the user to change the final position to the desired location which would be recorded. Once the desired position is set, the user would switch (B2) off to go back to (S2). It is worth mentioning that the user can only alter the position of the end-effector within the defined cooperative workspace. In order to initiate the reciprocating knife cutting process (S4), the user would use their foot to activate the push button (B3) which would maintain the cutting process until the user releases the button. For further safety and/or calibration, the user may send the SRL back to the homing state by pressing the homing button (B4).

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific computational models, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A supernumerary robotic limb (SRL) system comprising:
    a plurality of rigid links;
    at least one joint configured to connect a first rigid link to a second rigid link of the plurality of rigid links;
    a first variable stiffness actuator (VSA) of two VSAs extending along a first vertical axis and configured to rotate about the first vertical axis; and
    a second VSA of the two VSAs extending along a second vertical axis and configured to rotate about the second vertical axis, wherein the second vertical axis is horizontally offset from the first vertical axis, wherein the first vertical axis and the second vertical axis are parallel to one another, wherein the first VSA and the second VSA are coupled with the first rigid link and the second rigid link and configured to drive the plurality of rigid links, wherein a bracket of the first VSA holds the second VSA, and wherein the bracket is configured to move with movement of the first VSA.

2. The SRL system of claim 1, wherein each rigid link of the plurality of rigid links is composed of carbon-fiber tubes, aluminum, or a mixture of carbon-fiber tubes and aluminum.

3. The SRL system of claim 1, further comprising:
    at least one sensor attachable to at least one of the plurality of rigid links;
    a processor; and
    a memory that includes instructions executable by the processor for causing the processor to receive information of the at least one sensor and control movements of the SRL system based on the information of the at least one sensor.

4. The SRL system of claim 1, wherein the SRL system is implemented in a compensation mode to support at least one limb of a user or in an augmentation mode to act in place of at least one limb of the user.

5. The SRL system of claim 1, further comprising a harness and an end-effector, wherein the first VSA of the two VSAs and the second VSA of the two VSAs are positioned between the harness and the first rigid link, and wherein the end-effector is coupled to an end of the second rigid link.

6. The SRL system of claim 5, further comprising pulleys and a timing belt, wherein the second VSA is communicatively coupled to the second rigid link via the pulleys and the timing belt.

7. The SRL system of claim 6, further comprising a base beneath the first VSA, the base configured to support the first VSA, wherein the base is separate from the bracket, and wherein the bracket of the first VSA holds the first rigid link, wherein the first VSA is configured to control motion of the first rigid link, and wherein the second VSA is configured to control motion of the second rigid link through the timing belt.

8. The SRL system of claim 6, further comprising a sensor coupled with the end effector, and wherein information of the sensor is used to control motion of the SRL system by operating the first VSA and the second VSA.

9. The SRL system of claim 1, each VSA of the two VSAs comprising:
    an output link;
    a set of elastic elements mounted on the output link;
    an input link configured to provide kinetic energy for the output link;
    a dynamic chassis configured to connect with the input link; and
    a stiffness adjustor included in the dynamic chassis and configured to adjust an elastic transmission between at least one elastic element of the set of elastic elements and the output link.

10. The SRL system of claim 9, further comprising a VSA subsystem that includes the two VSAs, wherein the set of elastic elements comprises at least one torsional spring that includes an arm that is long enough to maintain contact with a force contact lever throughout a range of motion of the force contact lever from a center of the VSA to a point along a base center line associated with the at least one torsional spring.

11. The SRL system of claim 9, further comprising a VSA subsystem that includes the two VSAs, wherein each VSA is adapted to a source of actuation of the input link comprising an electromechanical, hydraulic, or pneumatic source.

12. The SRL system of claim 9, further comprising a VSA subsystem that includes the two VSAs, wherein each VSA is configured to enable rotations beyond 360 degrees.

13. The SRL system of claim 9, further comprising a VSA subsystem that includes the two VSAs, wherein the input link is configured to disengage the dynamic chassis as a safety measure.

14. The SRL system of claim 9, further comprising a VSA subsystem that includes the two VSAs, wherein the dynamic chassis comprises a gear train that includes a contact force lever.

15. The SRL system of claim 14, wherein the gear train comprises a gear ratio such that the contact force lever moves on a straight line from a center of rotation of the first VSA or the second VSA to a base center line of the set of elastic elements.

16. The SRL system of claim 14, wherein the stiffness adjustor is further configured to drive the gear train and vary a stiffness of each VSA by changing a position of the contact force lever.

17. The SRL system of claim 16, wherein the stiffness is varied according to a compliance curve that is defined based on at least one of a set of parameters of the set of elastic elements, the set of parameters comprising a number of active coils, a spring wire diameter, or an outer diameter per elastic element.

18. The SRL system of claim 16, wherein the stiffness of each VSA comprises a range of stiffnesses between a minimum value associated with the position of the contact force lever at the center of rotation of each VSA to a maximum value when the position of the contact force lever is at a position along the base center line of the set of elastic elements.

19. The SRL system of claim 18, wherein the gear train is selected to enable each VSA to cover the range of stiffnesses in less than 0.65 seconds.

\* \* \* \* \*